(12) United States Patent
Ishii et al.

(10) Patent No.: US 6,909,673 B2
(45) Date of Patent: Jun. 21, 2005

(54) MAGNETO-OPTICAL RECORDING APPARATUS HAVING A MAGNETIC HEAD WITH A REGULATING MEMBER

(75) Inventors: Kazuyoshi Ishii, Tokyo (JP); Shinnosuke Torii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 10/368,619

(22) Filed: Feb. 20, 2003

(65) Prior Publication Data
US 2003/0161220 A1 Aug. 28, 2003

(30) Foreign Application Priority Data

Feb. 22, 2002 (JP) .......................... 2002-046477
Jul. 23, 2002 (JP) .......................... 2002-214165
Sep. 19, 2002 (JP) .......................... 2002-273272

(51) Int. Cl.⁷ .................................... G11B 11/00
(52) U.S. Cl. .................... 369/13.12; 369/13.2
(58) Field of Search ................ 369/13.2, 13.12, 369/13.21, 13.02, 13.17

(56) References Cited

U.S. PATENT DOCUMENTS

| | | | | |
|---|---|---|---|---|
| 5,122,998 A | * | 6/1992 | Mizuno et al. ............ 369/13.2 |
| 5,202,863 A | * | 4/1993 | Miyatake et al. .......... 369/13.2 |
| 5,594,708 A | * | 1/1997 | Chaya ....................... 369/13.2 |
| RE35,608 E | * | 9/1997 | Yamatani ................... 369/13.2 |
| 6,044,043 A | * | 3/2000 | Aoki et al. ................ 369/13.2 |
| 6,091,673 A | * | 7/2000 | Murakami et al. ....... 369/13.12 |
| 6,314,062 B1 | * | 11/2001 | Suzuki et al. ............. 369/13.2 |

* cited by examiner

*Primary Examiner*—Tan Dinh
(74) *Attorney, Agent, or Firm*—Fitzpatrick, Cella, Harper & Scinto

(57) ABSTRACT

The magneto-optical recording apparatus of the present invention comprises: a magnetic head of which one end is fixed and of which the other end is free and provided with a magnetic field generating portion for applying a magnetic field onto a magneto-optical recording medium; an optical pickup, provided opposite the magnetic head with the recording medium between them, for irradiating a portion applied with a magnetic field from the magnetic head with a light beam; and a member for regulating displacement of the magnetic head in a direction parallel to a magneto-optical recording medium surface.

5 Claims, 30 Drawing Sheets

MAGNETO-OPTICAL RECORDING APPARATUS HAVING A MAGNETIC HEAD WITH A REGULATING MEMBER

BACKGROUND OF THE INVENTION

1. Field of the Invention

The present invention relates to a magneto-optical recording apparatus for recording information on a magneto-optical recording medium, and more particularly to a magneto-optical recording apparatus provided with a magnetic head for applying a magnetic field onto a magneto-optical recording medium.

2. Related Background Art

According to the prior art, there are known magneto-optical recording apparatuses which record information by applying a magnetic field onto a magneto-optical recording medium having a magneto-optical recording layer and irradiating it with a light beam. As a recording system for these magneto-optical recording apparatuses, there is a magnetic field modulation system by which information signals are recorded by inverting the orientation of the external magnetic field correspondingly to the information signals to be recorded while irradiating the medium with a laser beam of a desired intensity. Such a magnetic field modulation system is used in, for instance, apparatuses for MiniDisc (MD). In the magnetic field modulation system, a magnetic field is applied from a magnetic head to the optical axis of the light spot of an optical pickup provided opposite the magnetic head with the magneto-optical recording medium between them.

A magneto-optical recording apparatus of the magnetic field modulation system according to the prior art will be described below with reference to FIG. 1 and FIG. 2. FIG. 1 shows a sectional view wherein a magneto-optical disk 8, which is a magneto-optical recording medium, is loaded with a magnetic head 1, and FIG. 2, a sectional view wherein the magnetic head 1 is unloaded. In this prior art apparatus, one end of a load beam 3 is supported by the base 2 of the magnetic head 1 via a first leaf spring 4. To the other end of the load beam 3 is fitted via a second leaf spring 5 a magnetic head slider 7 having a magnetic pole core 6, which is a magnetic field generating unit.

Now, when the magnetic head is loaded as shown in FIG. 1, the magnetic head slider 7 is kept in contact with the magneto-optical disk 8 under a fixed pressure by the springy forces of the first leaf spring 4 and the second leaf spring 5. On the other hand, when the magnetic head 1 is unloaded, the load beam 3 is suppressed in the direction of arrow p by a lifting lever 10 as shown in FIG. 2, and the elastic deformation of the first leaf spring 4 displaces the load beam 3 to shunt the magnetic head slider 7 from the disk surface.

Further, the magnetic head 1 and an optical pickup 12 is linked by a linking member 13. The magnetic head 1 and the optical pickup 12, after being adjusted in position to align the optical axis of the light beam radiated from an object lens 14 provided within the optical pickup 12 and the intensity center of the magnetic field applied by the magnetic pole core 6, are screwed onto the linking member 13.

Incidentally, it is a trend in recent years for the magnetic pole core 6 of the magnetic head 1 to be reduced in inductance by decreasing the sectional area of the magnetic field generating face to be adaptable to high frequency recording in which the magnetic field is inverted at a high frequency of tens of MHz. Therefore, it is important for satisfactory recording and reproduction to align with high accuracy the magnetic field intensity center of this small magnetic pole core 6 and the center of the light spot from the optical pickup 12.

However, the prior art magneto-optical recording apparatus described above requires loading of the magnetic head 1 onto the disk surface over the window portion of a cartridge (not shown) in which the magneto-optical disk 8 is contained, inevitably resulting in a structure in which the load beam 3 in the magnetic head 1 has an inclined portion. For this reason, where the vertical motion of the disk surface due to unevenness of the substrate thickness or surface fluctuation as shown in FIG. 3 is represented by $\Delta Z$, the displacement of the magnetic head slider 7 in a direction parallel to the disk surface at the time by $\Delta X$, and the angles between the disk surface and the load beam when the disk surface is positioned at the top end the bottom end by $\theta_1$ and $\theta_2$, respectively, there will arise a displacement $\Delta X$ in a direction parallel to the magneto-optical disk surface, represented by $\Delta X = \Delta Z \times \tan[(\theta_1+\theta_2)/2]$ (Formula (1)), will occur. This causes the magnetic pole core 6 of the magnetic head 1 to deviate from the center of the irradiating beam of the optical pickup 12. Since it is necessary to prevent the irradiating beam from being off the magnetic pole core 6 even if the magnetic pole core 6 deviates, the size of the magnetic pole core 6 has to be increased, eventually giving rise to a problem of obstructing high frequency recording.

SUMMARY OF THE INVENTION

An object of the present invention is to provide a magneto-optical recording apparatus permitting a reduction in magnetic pole core size by regulating the displacement of the magnetic head in a direction parallel to the surface of the recording medium, and making possible high frequency recording.

In order to achieve this object, a magneto-optical recording apparatus of the present invention comprises:

a magnetic head of which one end is fixed and of which the other end is free and provided with a magnetic field generating portion for applying a magnetic field onto a magneto-optical recording medium;

an optical pickup, provided opposite the magnetic head with the recording medium between them, for irradiating a portion applied with a magnetic field from the magnetic head with a light beam; and a member for regulating the displacement of the magnetic head in a direction parallel to a magneto-optical recording medium surface.

Further details will be described afterwards with reference to preferred embodiments of the invention.

DESCRIPTION OF THE PREFERRED EMBODIMENTS

Preferred embodiments of the present will be described in detail below with reference to accompanying drawings.

(Embodiment 1)

Figure 1:
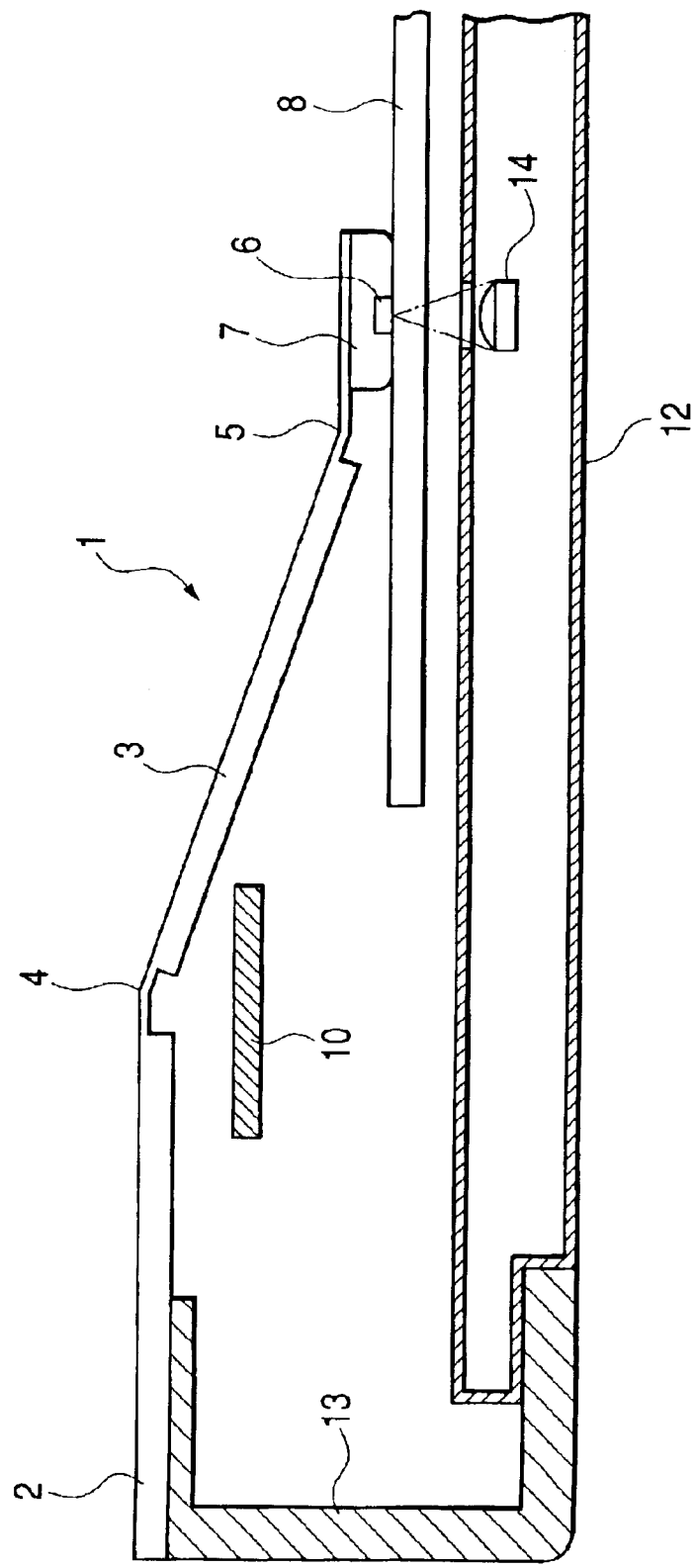
FIG. 1 shows a sectional view of a magneto-optical recording apparatus according to the prior art when its magnetic head is loaded.
Figure 2:
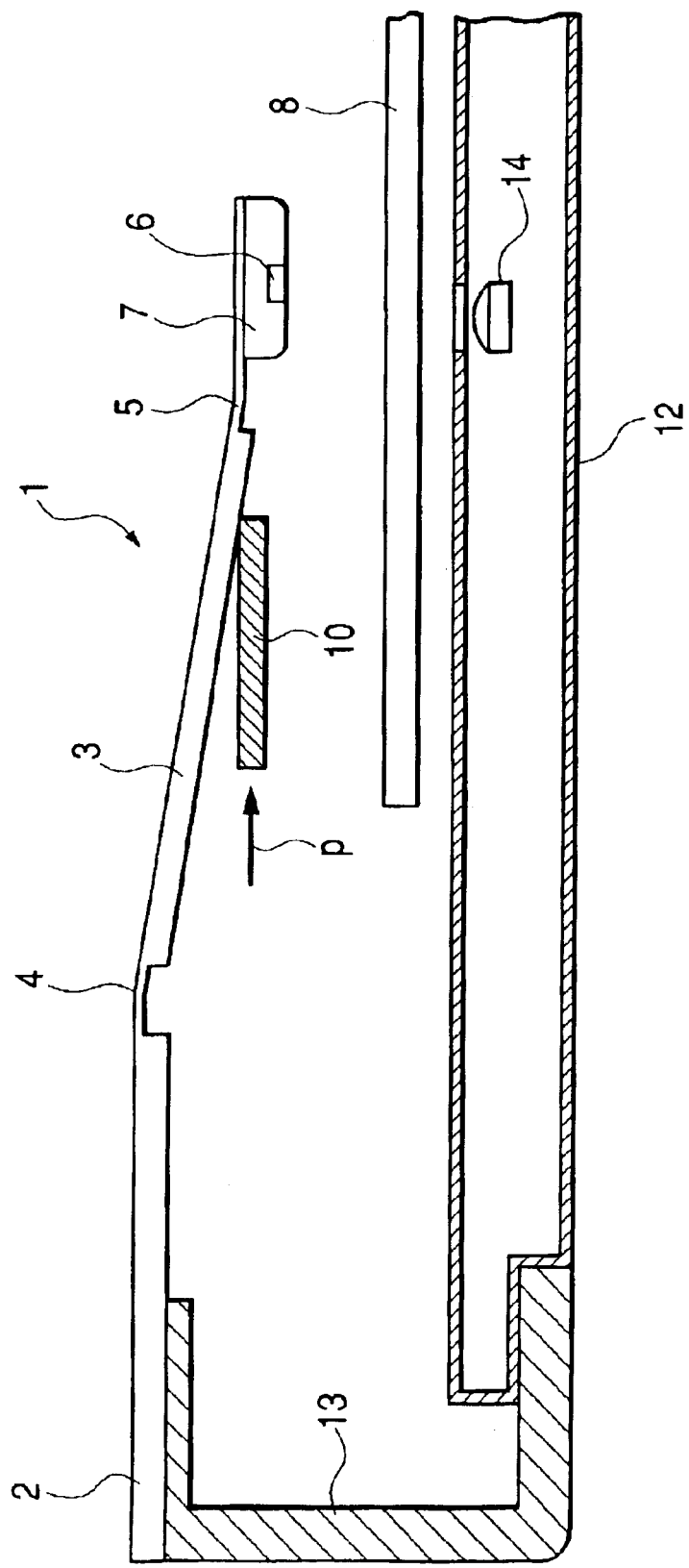
FIG. 2 shows a sectional view of the prior art magneto-optical recording apparatus of FIG. 1 when its magnetic head is unloaded.
Figure 3:
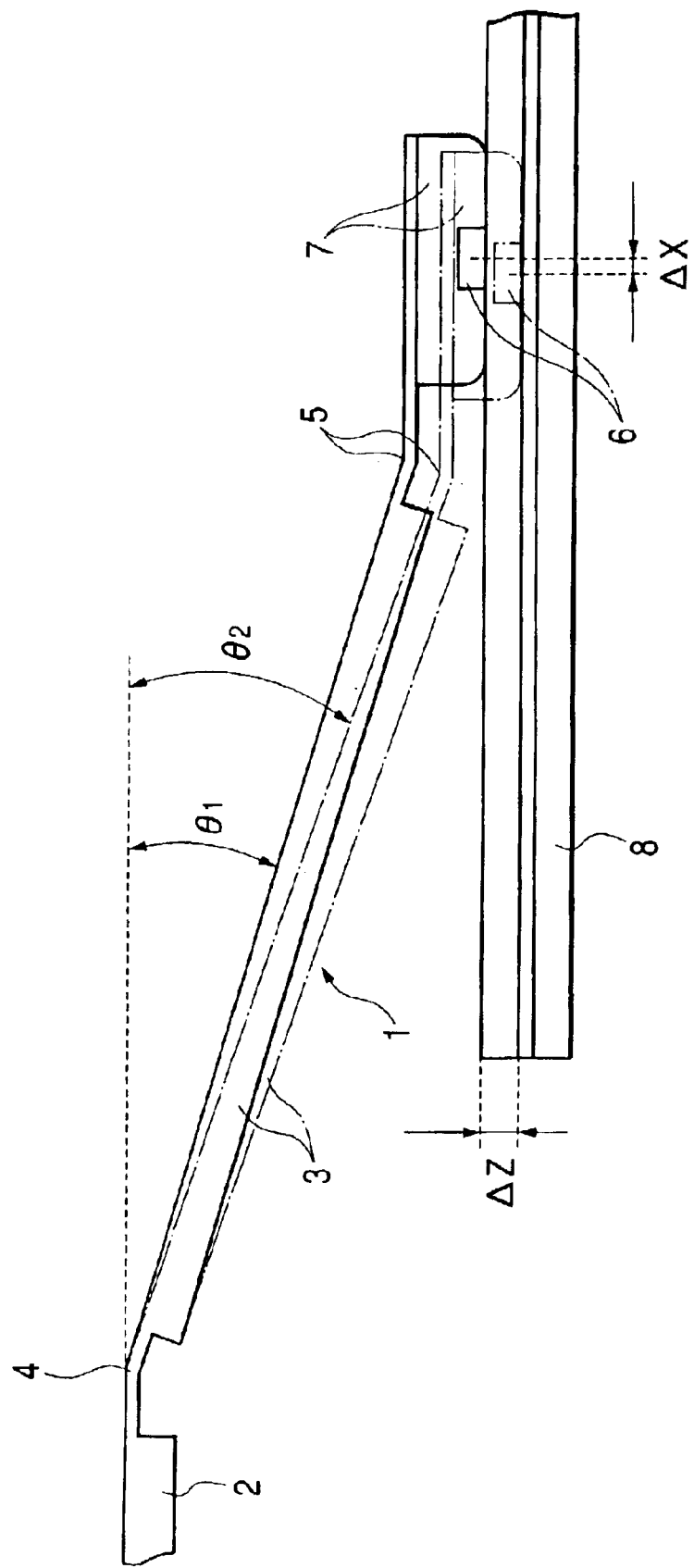
FIG. 3 is a diagram for describing the displacement of the magnetic head slider in a direction parallel to the disk surface in the prior art apparatus shown in FIG. 1.
Figure 4:
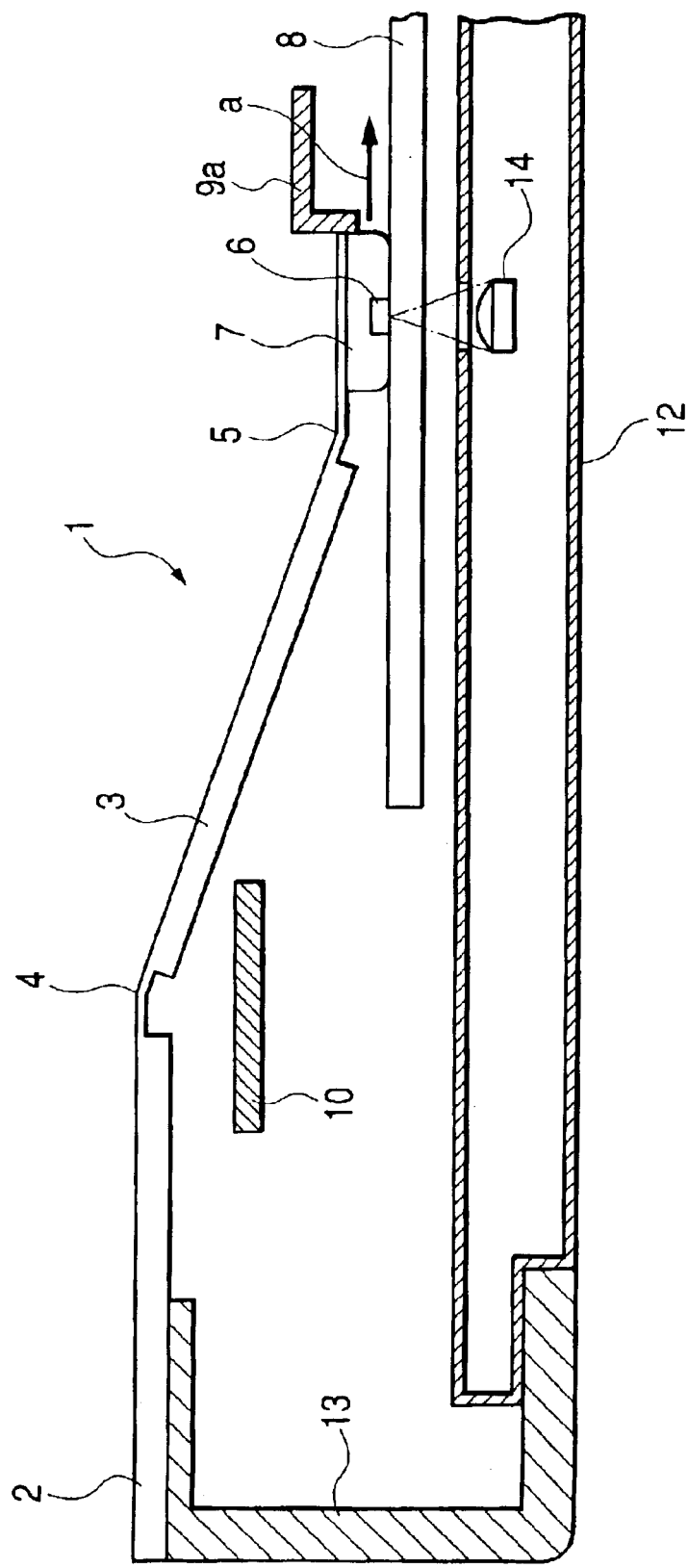
FIG. 4 shows a sectional view of the loaded state of a magnetic head in a magneto-optical recording apparatus, which is Embodiment 1 of the present invention.
Figure 5:
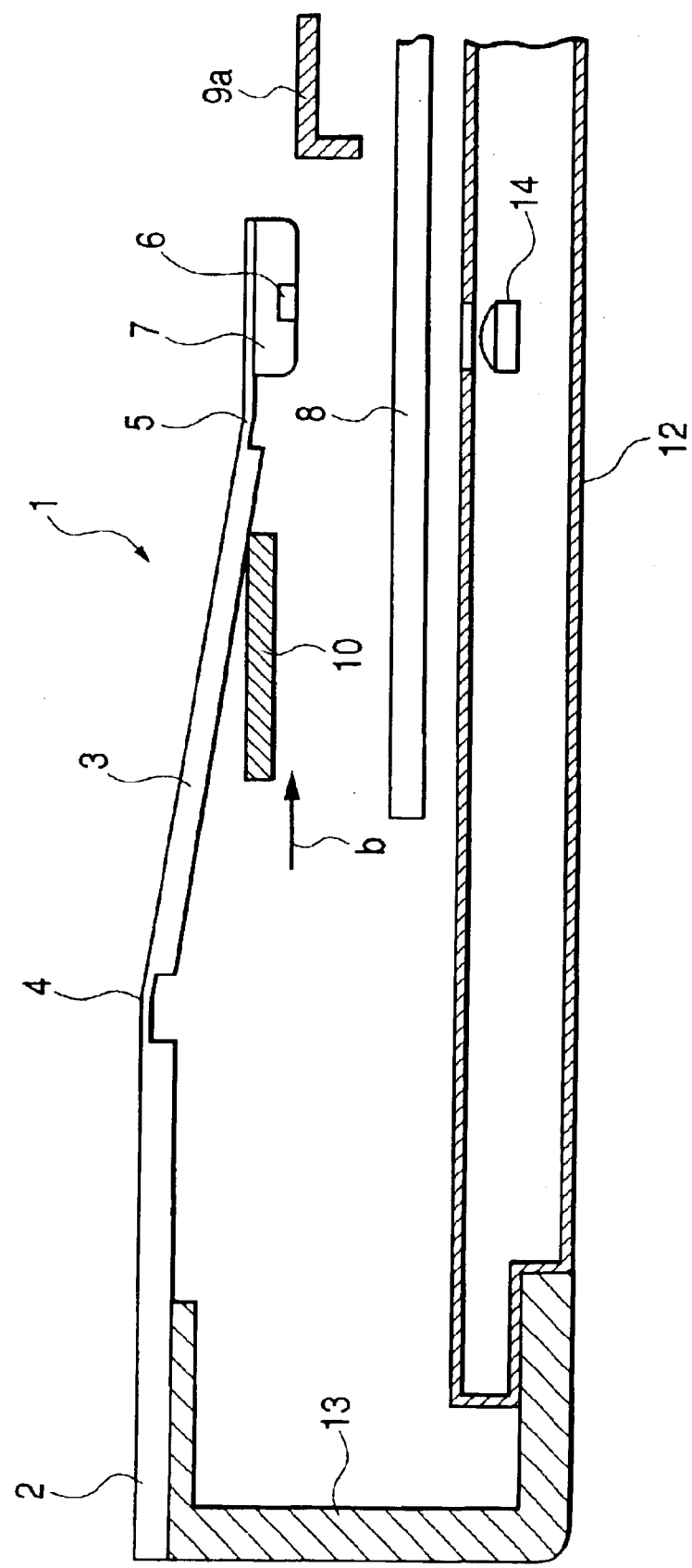
FIG. 5 shows a sectional view of the unloaded state of the magnetic head in Embodiment 1 of the invention.

FIG. 4 and FIG. 5 illustrate a magneto-optical recording apparatus, which is a first embodiment of the present invention. FIG. 4 shows a sectional view of the loaded state of the magnetic head 1, and FIG. 5, a sectional view of the unloaded state of the magnetic head 1. To add, in FIG. 4 and FIG. 5, the same parts as their counterparts in the prior art apparatus shown in FIG. 1 and FIG. 2 are designated by respectively the same reference characters, and their description is dispensed with.

In Embodiment 1, one end of a load beam 3 is supported by the base 2 of the magnetic head 1 via a first leaf spring 4, and to the other end of the load beam 3 is fitted via a second leaf spring 5 a magnetic head slider 7 having a magnetic pole core 6, which is the magnetic field generating portion. This supporting structure for the magnetic head 1 is the same as its counterpart in the prior art. In this embodiment, a regulating member 9a is further provided to regulate the shifting of the magnetic head slider 7 in a direction parallel to the disk surface.

The regulating member 9a is in an L shape, and the coming into contact of the magnetic head slider 7 with the bent tip of the regulating member 9a regulates the shifting of the magnetic head slider 7 in the direction parallel to the disk surface. Further, the regulating member 9a is arranged in the radial direction of the magneto-optical disk 8 (the direction vertical to the surface of the drawing). When information is to be recorded, it is accomplished by applying, while irradiating the magneto-optical disk 8 with a recording light beam from the object lens 14 of the optical pickup 12, a recording magnetic field from the magnetic head 1 onto the light beam-irradiated region in the magnetic head-loaded state shown in FIG. 4.

Figure 6:
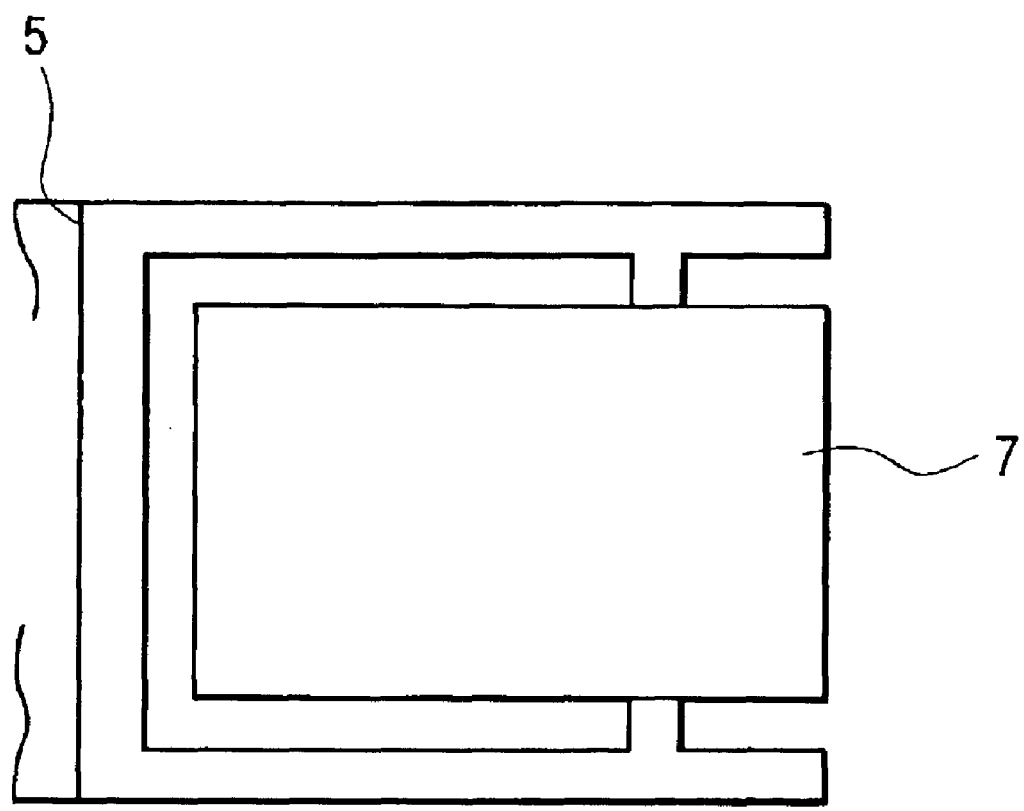
FIG. 6 shows a plan of a magnetic head slider in Embodiment 1 of the invention.

FIG. 6 shows a plan of the second leaf spring 5 and the magnetic head slider 7. The magnetic head slider 7, configured as illustrated in FIG. 6, follows the vertical motions of the disk surface. The magnetic head 1 is pressed all the time toward the disk surface of the magneto-optical disk 8 by the springy forces of the first leaf spring 4 and the second leaf spring 5.

As shown in FIG. 4, the regulating member 9a is so arranged as to regulate the magnetic head slider 7 in the load state of the magnetic head 1 against its displacement in a direction parallel to the disk surface (the direction indicated by arrow a). A transfer of the magnetic head to the unloaded state is accomplished by the pressing of the load beam 3 against the springy force of the first leaf spring 4 to lift the magnetic head slider 7 with the regulating member 9a being shifted to a position where it does not interfere with the magnetic head 1 as shown in FIG. 5 and the lifting lever 10 sliding in the direction of arrow b.

The magnetic head 1 and the optical pickup 12 are linked by a linking member 13. The magnetic head 1 and the optical pickup 12, after being adjusted in position to align the optical axis of the light beam radiated from an object lens 14 provided within the optical pickup 12 and the intensity center of the magnetic field applied by the magnetic pole core 6, are fixed to the linking member 13 by screwing, adhering or otherwise.

In this embodiment, as the regulating member 9a regulates the displacement of the magnetic head slider 7 in the direction of arrow a, the magnetic head slider 7 is displaced only in the direction vertical to the disk surface when the disk surface has risen above its level in the magnetic head-loaded state. For this reason, it is made possible to regulate any gap between the center of the irradiating beam from the object lens 14 of the optical pickup 12 and the magnetic pole core 6 of the magnetic head 1 and accordingly to reduce the size of the magnetic pole core 6, resulting in compatibility with high frequency recording.

(Embodiment 2)

Figure 7:
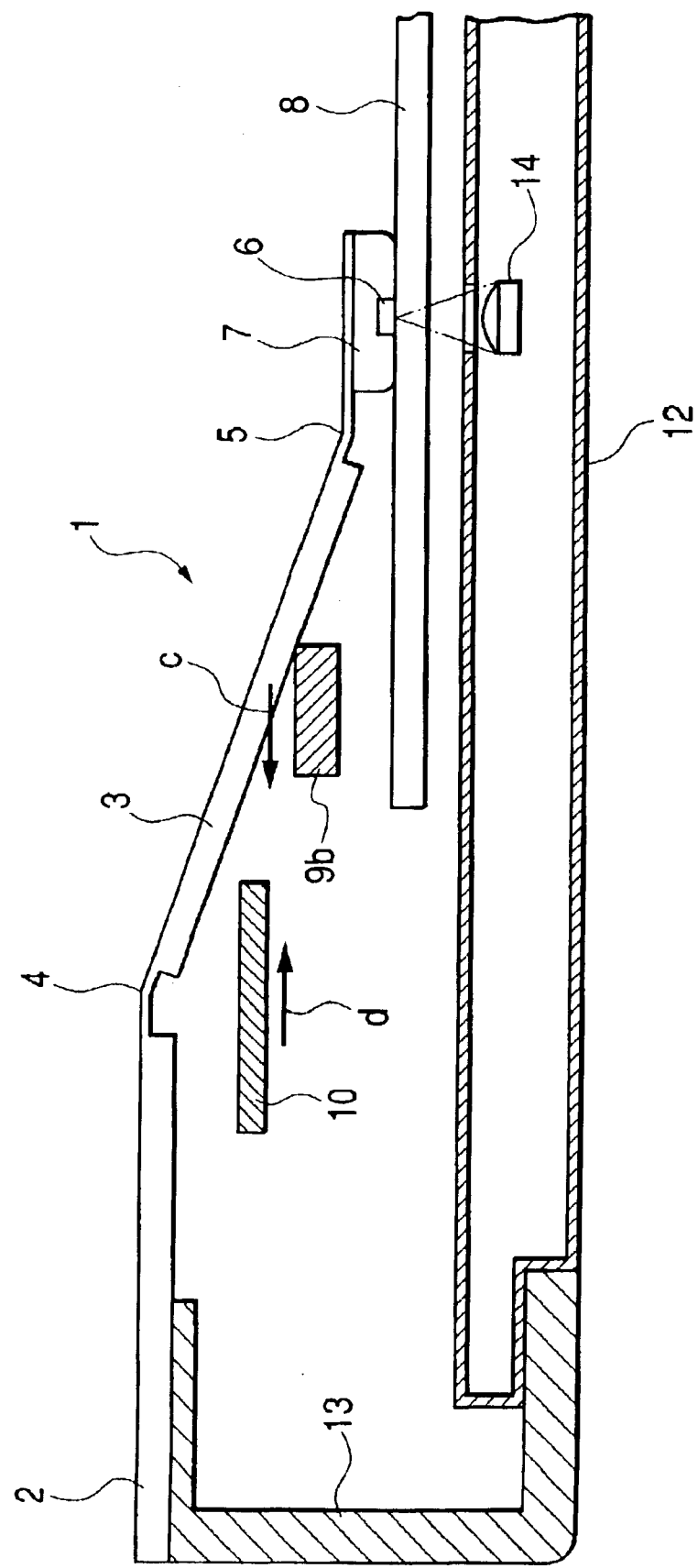
FIG. 7 shows a sectional view of the loaded state of a magnetic head in a magneto-optical recording apparatus, which is Embodiment 2 of the invention.

FIG. 7 shows a sectional view of the loaded state of a magnetic head in a magneto-optical recording apparatus, which is a second embodiment of the present invention. This embodiment, similar to Embodiment 1 in basic structure, differs in that a regulating member 9b is positioned underneath the load beam 3. The regulating member 9b is arranged in the radial direction of the magneto-optical disk 8 (the direction vertical to the surface of the drawing).

Here, it being supposed that the base 2, the load beam 3 and the magnetic head slider 7 constitute a rigid part and the first leaf spring 4 and the second leaf spring 5 constitute a deformable part, as the element which forms the greatest angle to the disk surface among these elements is the load beam 3, the regulating member 9b is position underneath the load beam 3 to regulate the displacement of the load beam 3 in the direction of arrow c in the magnetic head-loaded state. The magnetic head slider 7 is caused to follow the vertical motions of the disk surface by the springy force of the second leaf spring 5. Further, the sliding of the lifting lever 10 in the direction of arrow d presses the load beam 3 to shift to the magnetic head-unloaded state.

In this embodiment, in the magnetic head-loaded state, the load beam 3 is pressed against the regulating member 9b by the springy force of the first leaf spring 4. Therefore, as the regulating member 9b regulates the displacement of the load beam 3 in the direction of arrow c, the magnetic head slider 7 rotates around the second leaf spring 5 and, because the angle formed between the second leaf spring 5 and the disk surface is smaller than that formed between the load beam 3 and the disk surface as stated above, the displacement of the magnetic head slider 7 in the direction parallel to the disk surface can be regulated when the disk surface has descended. Accordingly, the gap between the center of the irradiating beam from the object lens 14 of the optical pickup 12 and the magnetic pole core 6 of the magnetic head 1 can be narrowed, thereby making it possible to reduce the size of the magnetic pole core 6.

(Embodiment 3)

Figure 8:
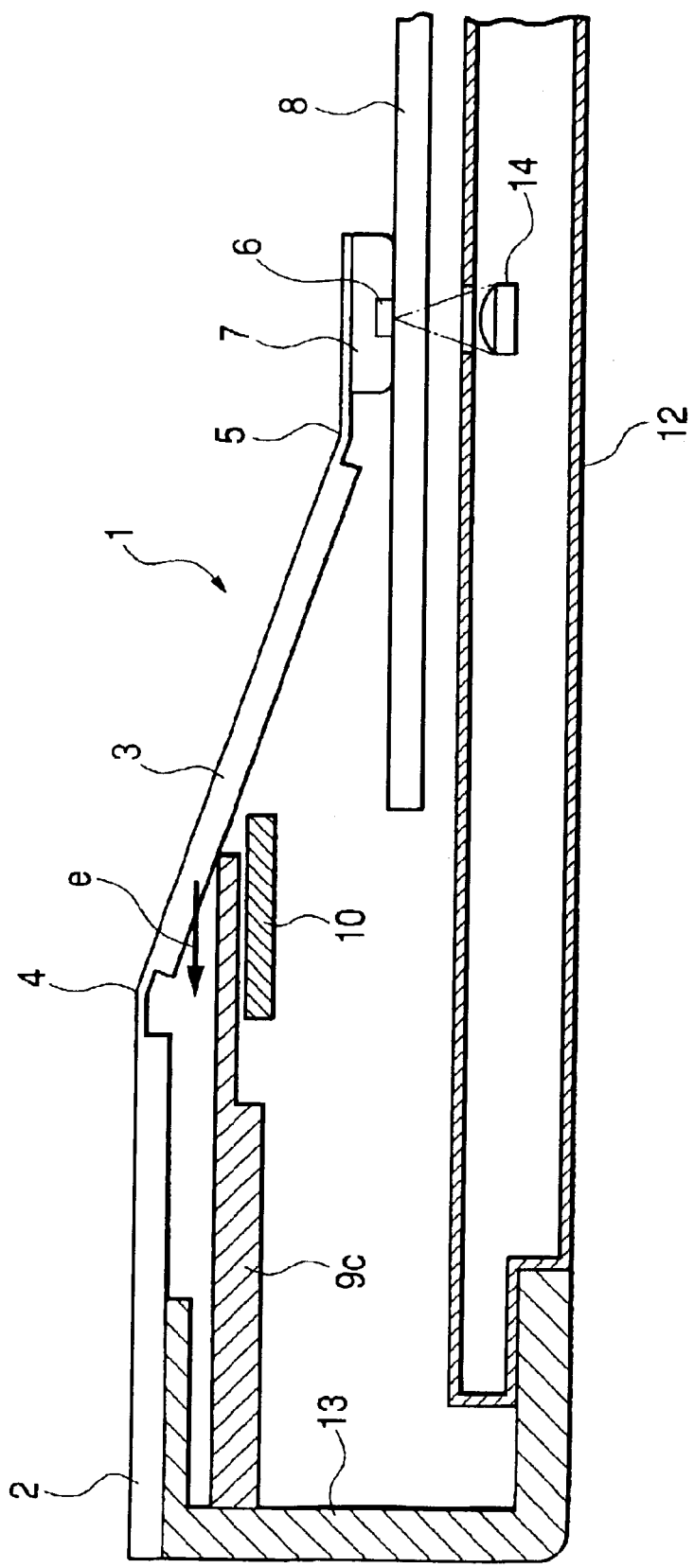
FIG. 8 shows a sectional view of the loaded state of a magnetic head in a magneto-optical recording apparatus, which is Embodiment 3 of the invention.
Figure 9:
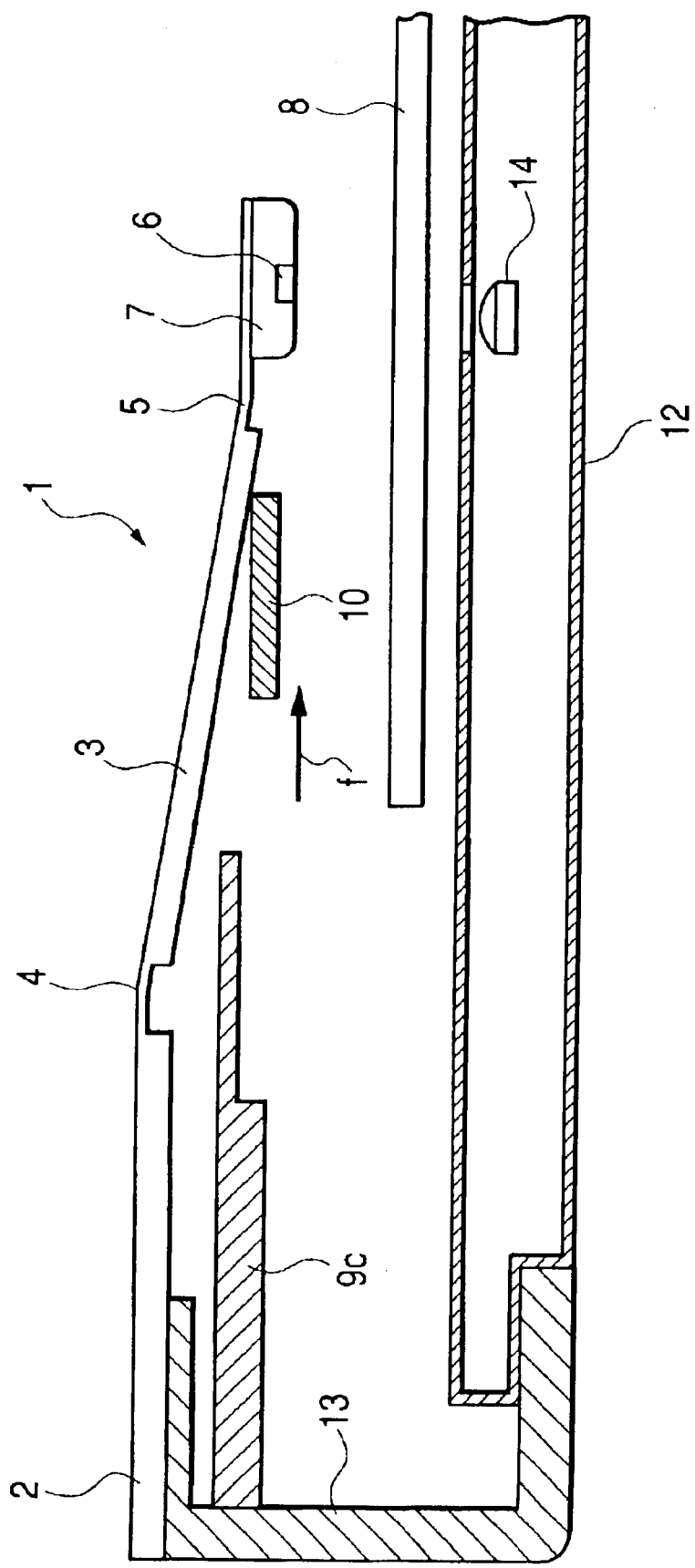
FIG. 9 shows a sectional view of the unloaded state of the magnetic head in Embodiment 3 of the invention.

FIG. 8 and FIG. 9 illustrate a third embodiment of the present invention. FIG. 8 shows a sectional view of the magnetic head-loaded state and FIG. 9, that in the magnetic head-unloaded state. This embodiment, similar to Embodiment 2 in basic structure, differs in that one end of a regulating member 9c is fixed to the linking member 13 and the other end of the regulating member 9c regulates the displacement of the load beam 3 in the direction of arrow e in the magnetic head-loaded state. Further, the sliding of the lifting lever 10 in the direction of arrow f presses the load beam 3 to shift to the magnetic head-unloaded state.

In this embodiment, since the regulating member 9c regulates the displacement of the load beam 3 in the direction of arrow e as in Embodiment 2, the displacement of the magnetic head slider 7 in the direction parallel to the disk surface can be regulated when the disk surface has descended. Furthermore, unlike in Embodiment 2 the regulating member 9c is arranged toward the fixed end of the magnetic head 1, the relative positional accuracy of the magnetic head 1 and the regulating member 9c in the magnetic head-loaded state can be improved. To add, although the regulating member 9c is fixed to the linking member 13 in this embodiment, it is also possible to fix it toward the fixed end including the base 2.

(Embodiment 4)

Figure 10:
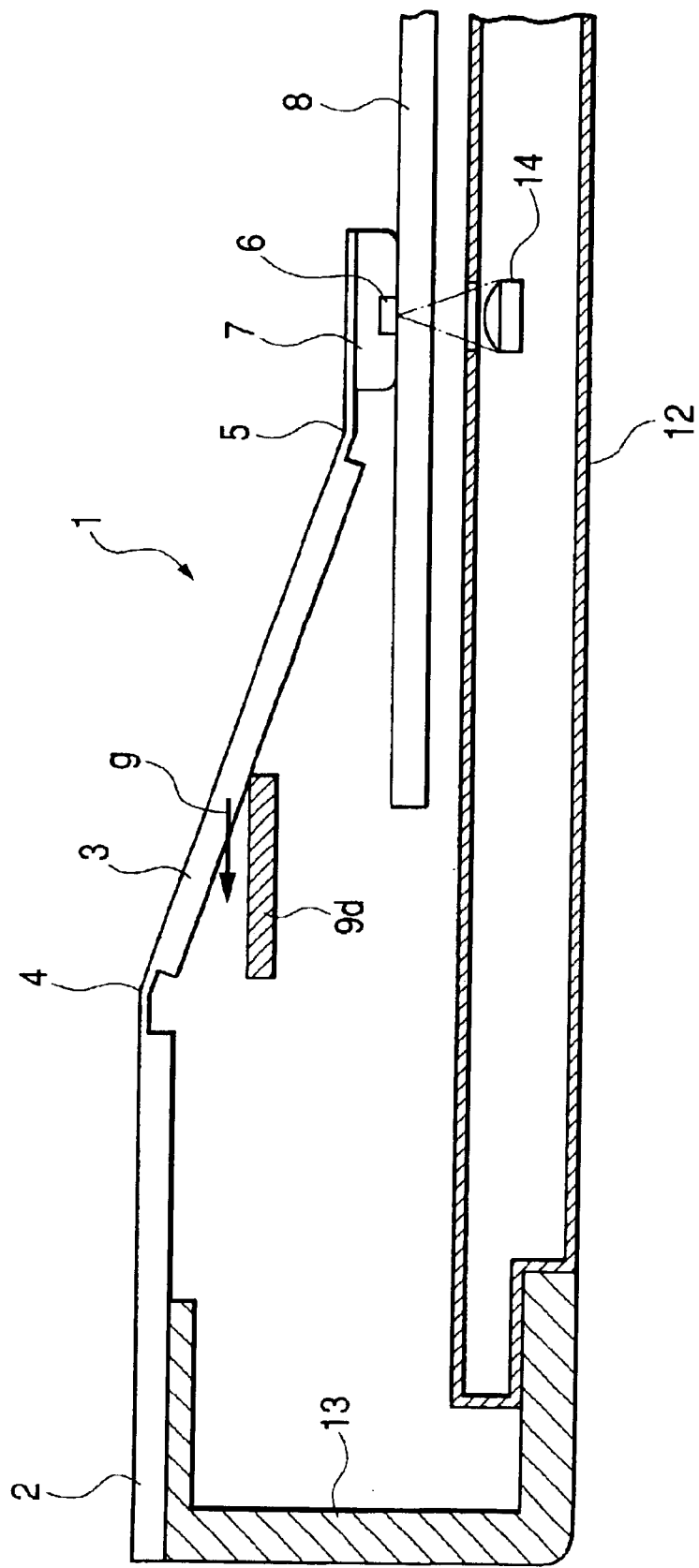
FIG. 10 shows a sectional view of the loaded state of a magnetic head in a magneto-optical recording apparatus, which is Embodiment 4 of the invention.
Figure 11:
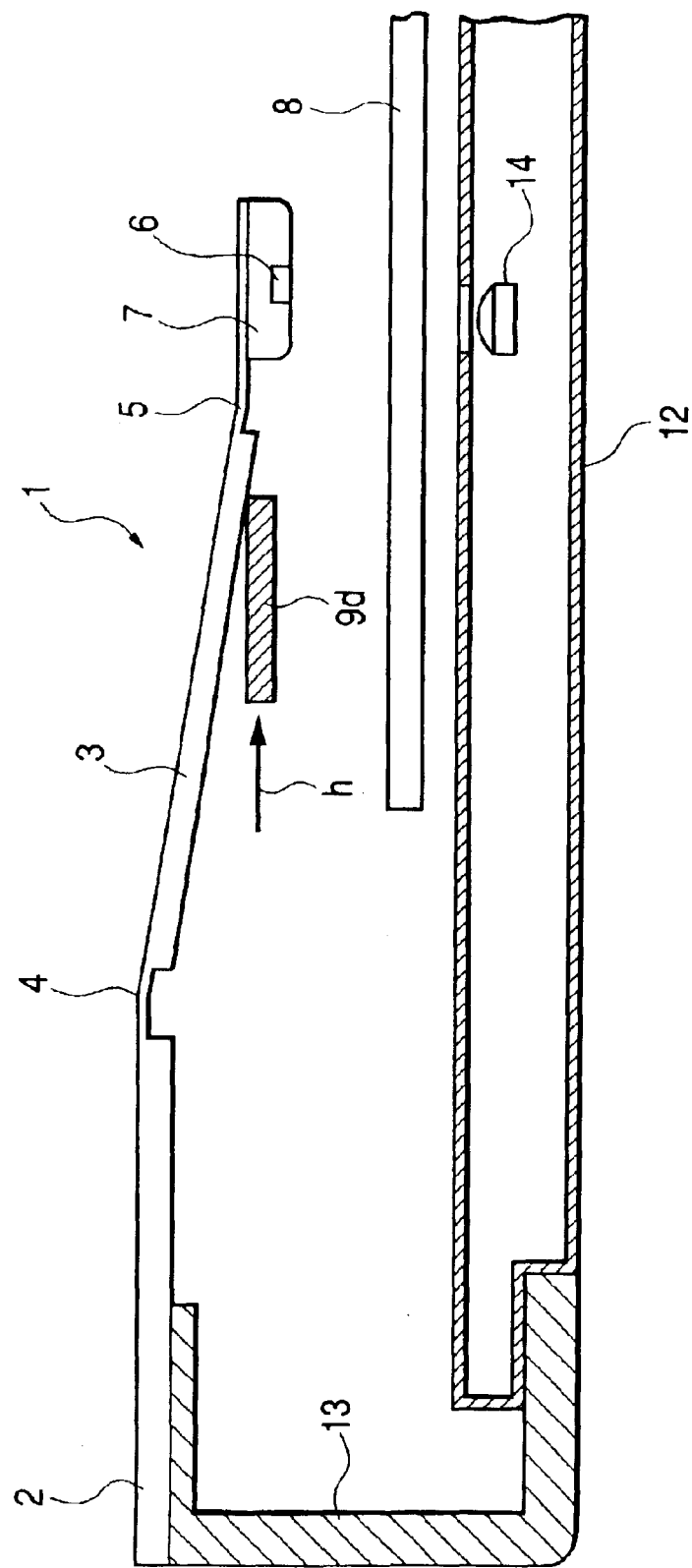
FIG. 11 shows a sectional view of the unloaded state of the magnetic head in Embodiment 4 of the invention.

FIG. 10 and FIG. 11 illustrate a fourth embodiment of the present invention. FIG. 10 shows a sectional view of the magnetic head-loaded state and FIG. 11, the magnetic head-unloaded state. This embodiment, similar to Embodiment 2 in basic structure, differs in that a regulating member 9d, which also serves as a lifting lever, regulates the displacement of the load beam 3 in the direction of arrow g in the magnetic head-loaded state. The regulating member 9d is arranged in the radial direction of the magneto-optical disk 8 (the direction vertical to the surface of the drawing). Further, the sliding of the regulating member 9d, which also serves as a lifting lever, in the direction of arrow h, presses the load beam 3 to shift to the magnetic head-unloaded state.

In this embodiment, since the regulating member 9d regulates the displacement of the load beam 3 in the direction of arrow g as in Embodiment 2, the displacement of the magnetic head slider 7 in the direction parallel to the disk surface can be regulated when the disk surface has descended. Furthermore, as the regulating member 9d also serves as a lifting lever, the configuration can be simplified, and the number of constituent parts reduced, correspondingly.

(Embodiment 5)

Figure 12:
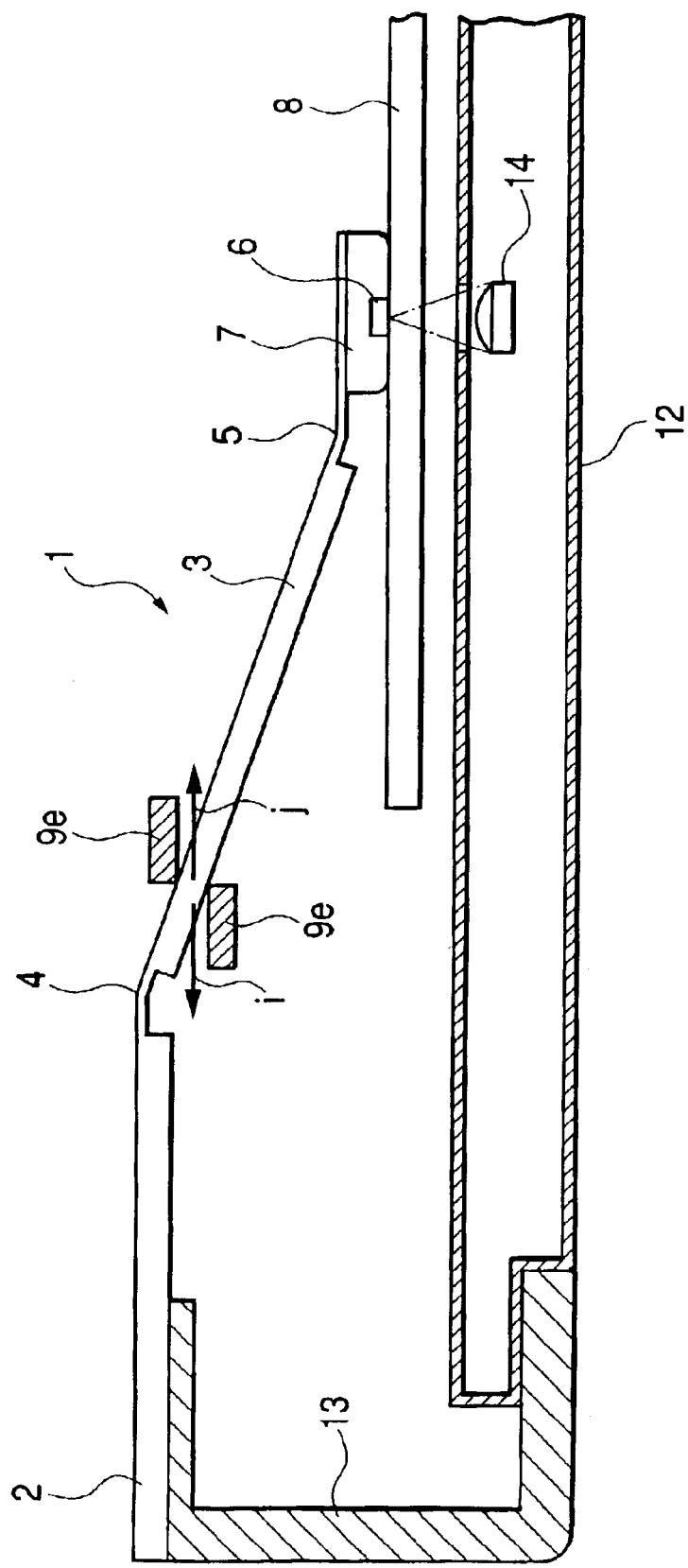
FIG. 12 shows a sectional view of the loaded state of a magnetic head in a magneto-optical recording apparatus, which is Embodiment 5 of the invention.
Figure 13:
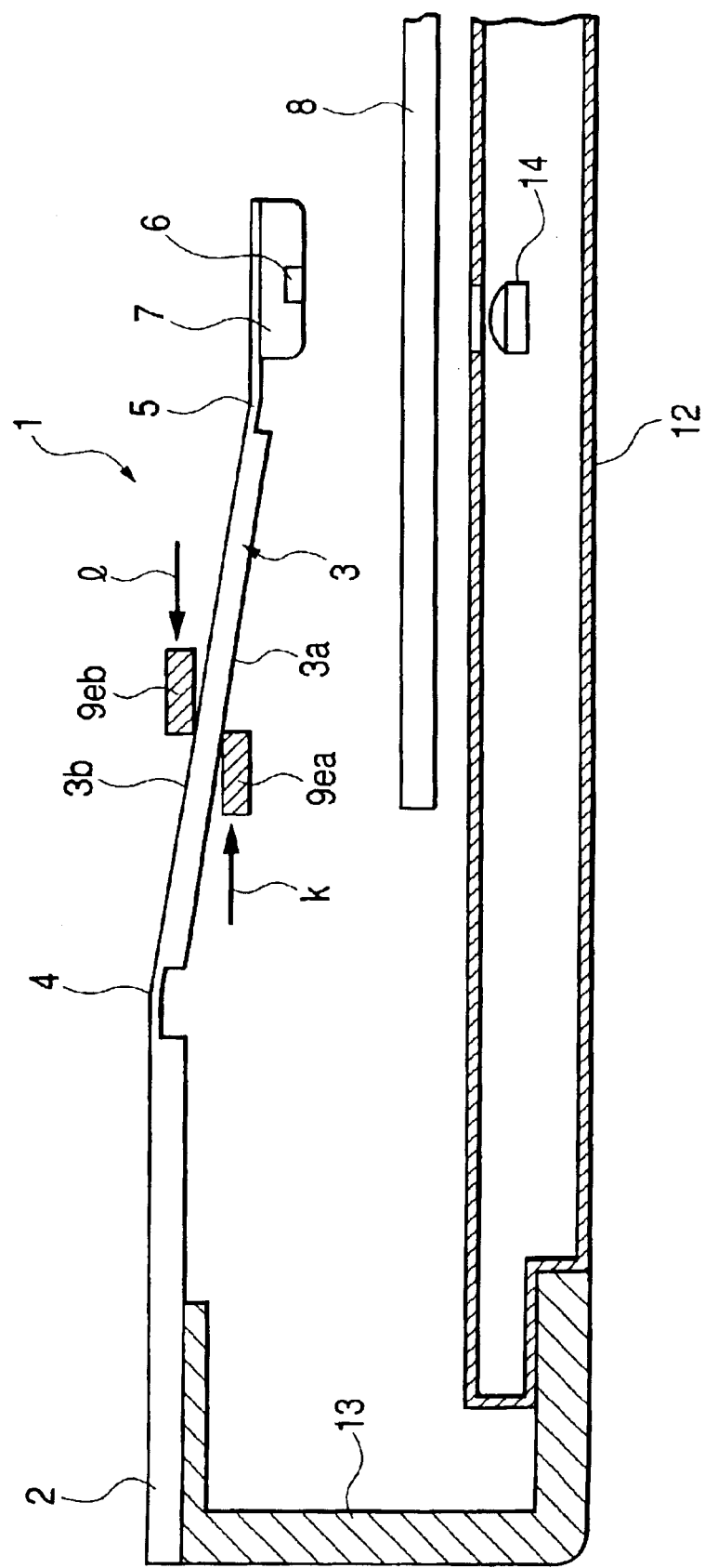
FIG. 13 shows a sectional view of the unloaded state of the magnetic head in Embodiment 5 of the invention.
Figure 14:
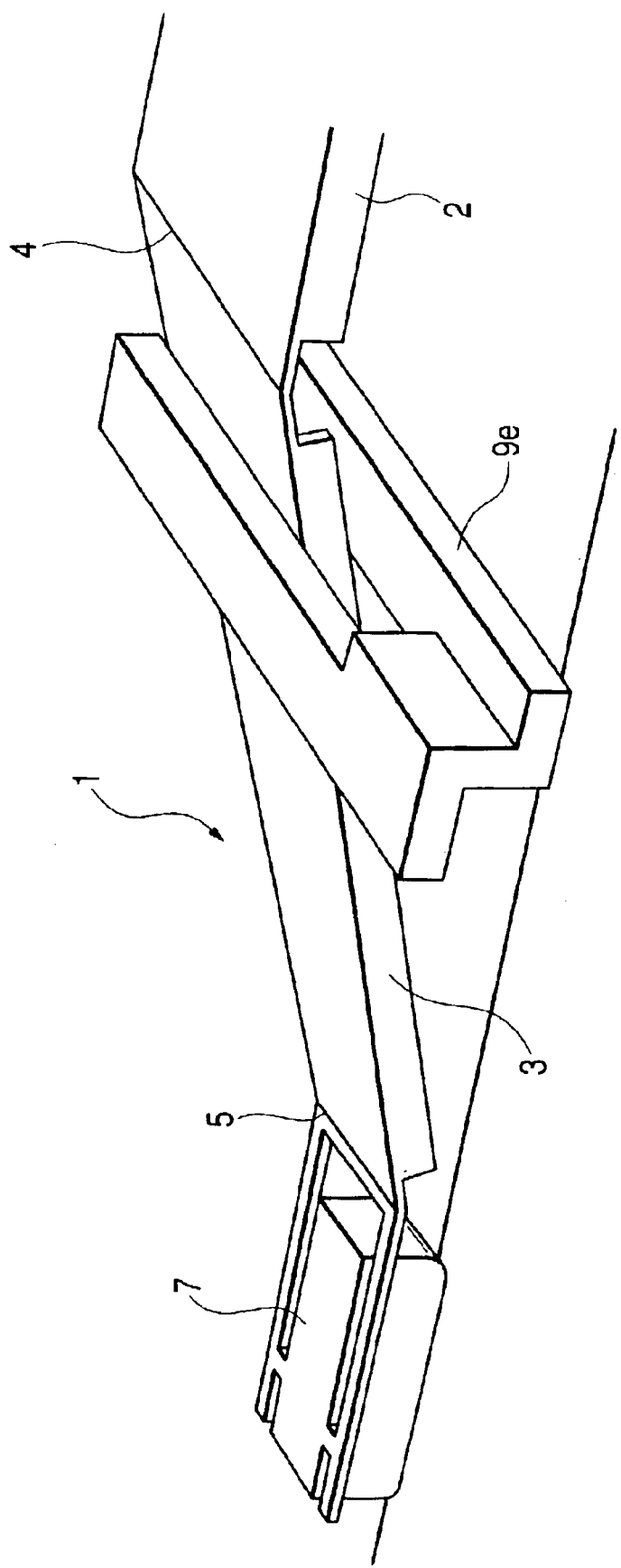
FIG. 14 shows a perspective view of the main part of Embodiment 5 of the invention.

FIG. 12, FIG. 13 and FIG. 14 illustrate a fifth embodiment of the present invention. FIG. 12 shows a sectional view of the magnetic head-loaded state; FIG. 13 the magnetic head-unloaded state; and FIG. 14, a perspective view of the main part including a regulating member and the load beam. This embodiment, similar to Embodiment 2 in basic structure, differs in that a regulating member 9e, which also serves as a lifting lever, formed in a shape to hold the load beam 3 within it as shown in FIG. 14, regulates the displacement of the load beam 3 in the directions of arrows i and j all the time. The regulating member 9e is arranged in the radial direction of the magneto-optical disk 8 (the direction vertical to the surface of the drawing).

Further, the spacing between the 9ea portion and the 9eb portion of the regulating member 9e, which also serves as a lifting lever, is set to match the magnetic head-loaded state shown in FIG. 12, and the clearances between them and the load beam 3 is widened when shifting to the magnetic head-unloaded state. In this embodiment, the sliding of the regulating member 9e, which also serves as a lifting lever, in the direction of arrow k causes the 9ea portion of the regulating member 9e to press the 3a face of the load beam 3 to shift to the magnetic head-unloaded state. Further, the sliding of the regulating member 9e, which also serves as a lifting lever, in the direction of arrow 1 causes the 9eb portion of the regulating member 9e to press the 3b face of the load beam 3 to shift to the magnetic head-loaded state.

In this embodiment, since the above-described configuration causes the regulating member 9e to regulate the displacement of the load beam 3 in the direction of arrow i as in Embodiment 2, the displacement of the magnetic head slider 7 in the direction parallel to the disk surface can be regulated when the disk surface has descended. Furthermore, as the regulating member 9e also serves as a lifting lever, the configuration can be simplified, and the number of constituent parts reduced, correspondingly as compared Embodiment 2. In addition, as the regulating member 9e can also regulate displacement in the direction of arrow j, the displacement of the magnetic head slider 7 in parallel to the disk surface can be regulated when the disk surface has ascended.

(Embodiment 6)

Figure 15:
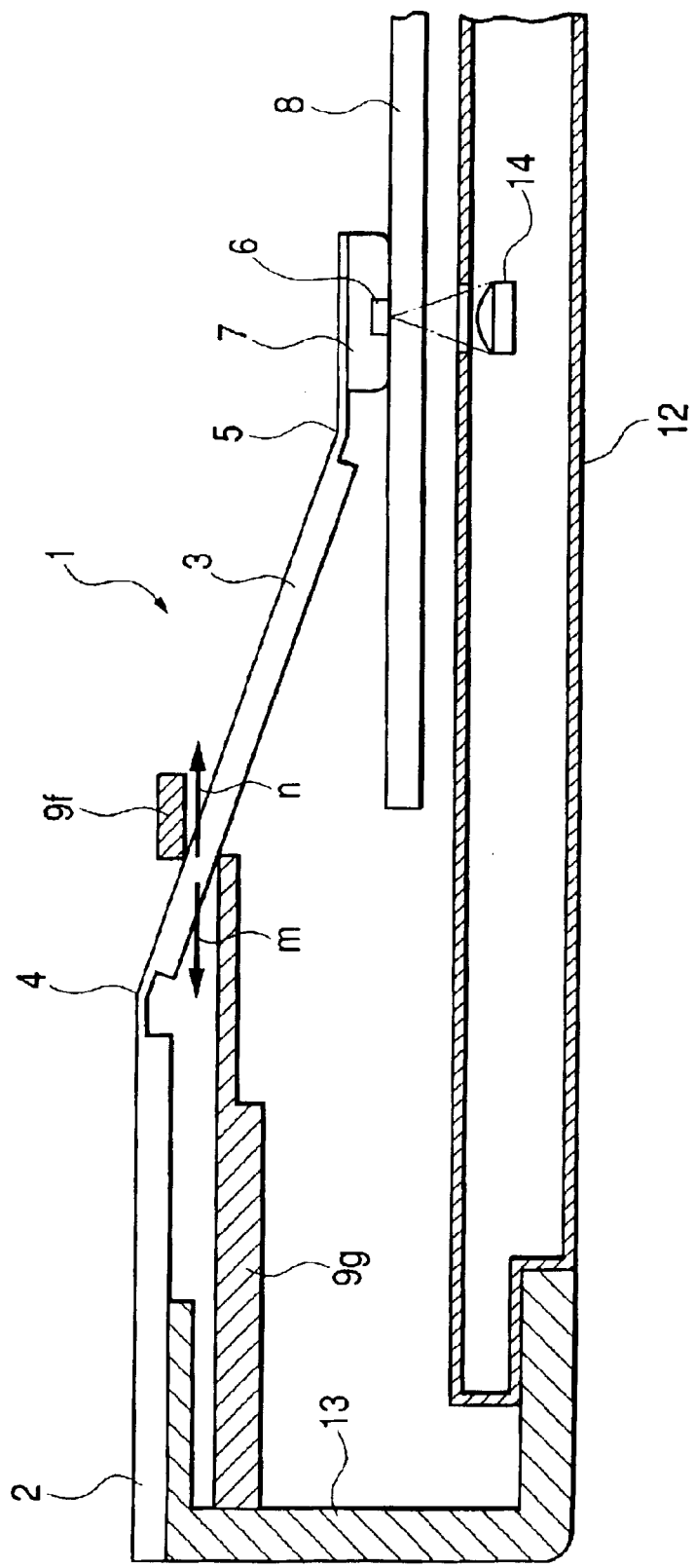
FIG. 15 shows a sectional view of the loaded state of a magnetic head in a magneto-optical recording apparatus, which is Embodiment 6 of the invention.
Figure 16:
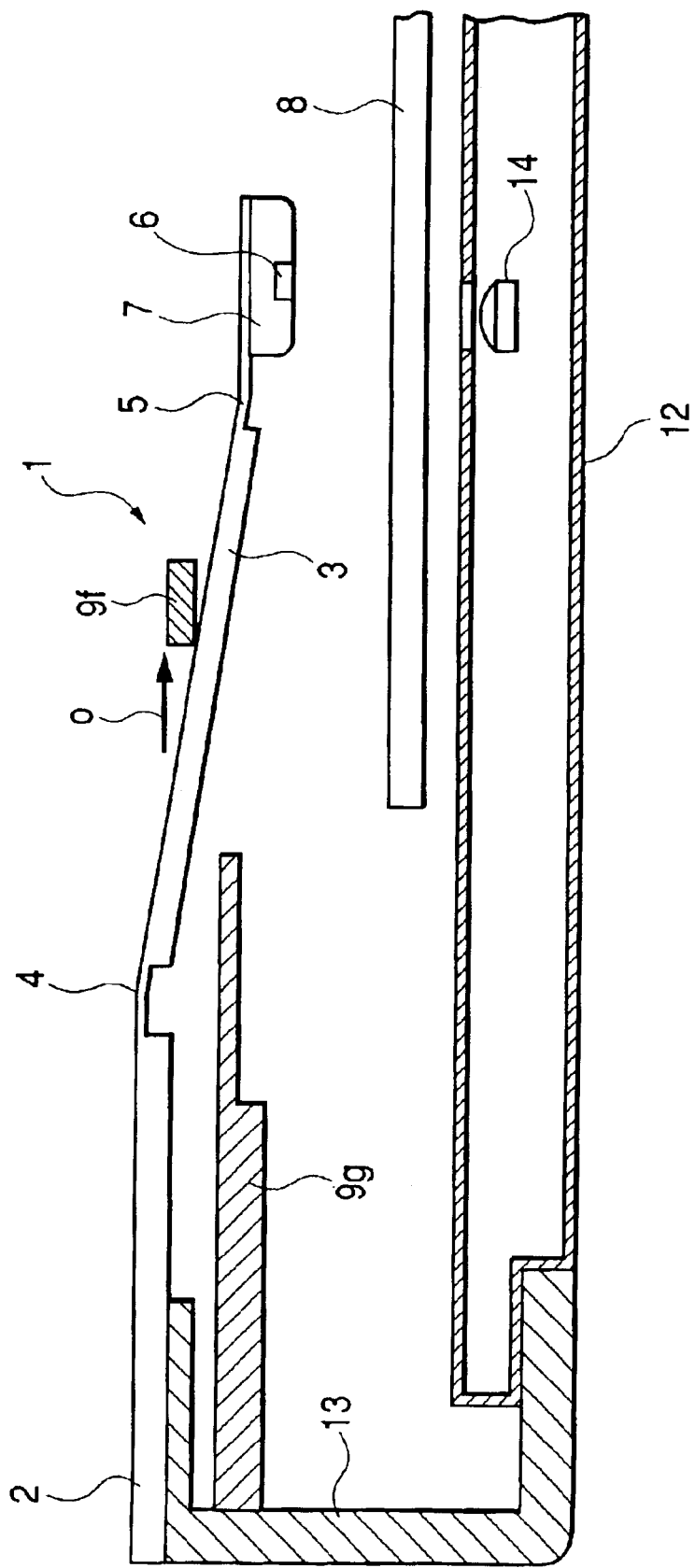
FIG. 16 shows a sectional view of the unloaded state of the magnetic head in Embodiment 6 of the invention.

FIG. 15 and FIG. 16 illustrate a sixth embodiment of the present invention. FIG. 15 shows a sectional view of the magnetic head-loaded state and FIG. 16, the magnetic head-unloaded state. This embodiment has a structure in which the configuration of Embodiment 3 is augmented with a regulating member 9f; regulating members 9g and 9f are formed to hold the load beam 3 between them. One end of the regulating member 9g is fixed to the linking member 13. The regulating member 9f is arranged in the radial direction of the magneto-optical disk 8 (the direction vertical to the surface of the drawing). The regulating member 9f also serves as a lifting lever. Here the first leaf spring 4 is pressed all the time in the direction of shunting from the disk surface, while the second leaf spring 5 is pressed toward the disk surface.

In this embodiment, the load beam 3 is pressed by the regulating member 9f, which also serves as a lifting lever, against the springy force of the first leaf spring 4 in the magnetic head-loaded state, and loads the magnetic head slider 7 onto the disk surface. In the magnetic head-loaded state, the regulating member 9f, which also serves as a lifting lever, and the regulating member 9g fixed to the base 2 regulate the displacement of the load beam 3 in the directions of arrows m and n all the time. Furthermore, the sliding of the regulating member 9f, which also serves as a lifting lever, in the direction of arrow o causes the springy force of the first leaf spring 4 to bring about a shift to the magnetic head-unloaded state.

In this embodiment, as the regulating member 9g regulates the displacement of the load beam 3 in the direction of arrow m as in Embodiment 3, the displacement of the magnetic head slider 7 in the direction parallel to the disk surface can be regulated when the disk surface has descended. Furthermore, as the regulating member 9g is arranged toward the fixed end of the magnetic head 1 unlike in Embodiment 2, the relative positional accuracy of the magnetic head 1 and the regulating member 9g in the magnetic head-loaded state can be improved. In addition, since the displacement in the direction of arrow n can also be regulated by the regulating member 9f, the displacement of the magnetic head slider 7 in the direction parallel to the disk surface can be regulated when the disk surface has ascended.

(Embodiment 7)

Figure 17:
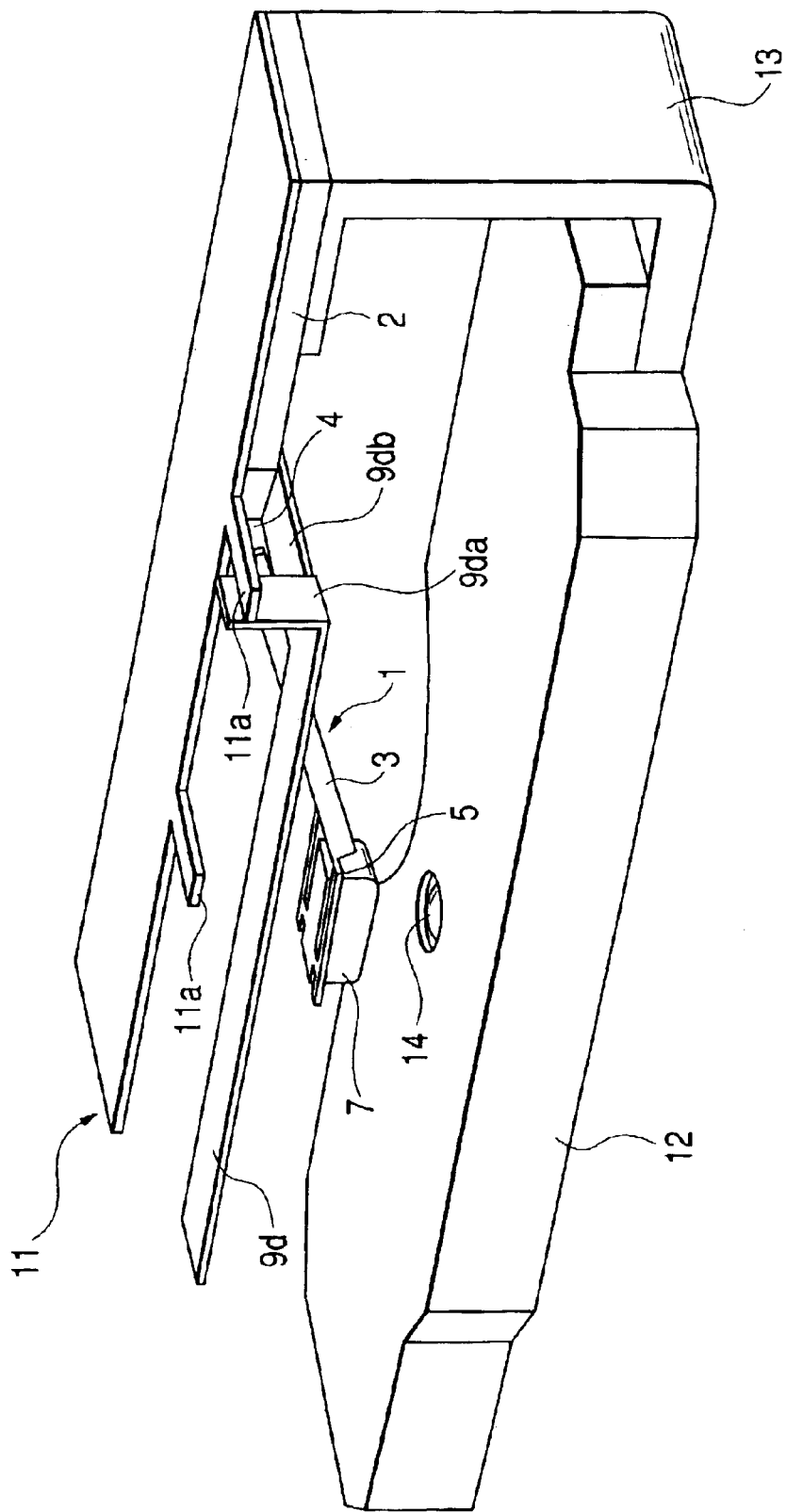
FIG. 17 shows a perspective view of a magneto-optical recording apparatus, which is Embodiment 7 of the invention.

FIG. 17 shows a perspective view of a seventh embodiment of the present invention. This embodiment, similar to Embodiment 4 in basic structure, differs in that a projecting portion 11 is provided over the base 2 of the magnetic head 1 in this embodiment. Usually the projecting portion 11 is provided to protect the magnetic head from impacts or as a buffer stop for the magnetic head slider 7 when shunting from the disk surface in the magnetic head-unloaded state. Further, the regulating member 9d, which also serves as a lifting lever, is arranged, and this regulating member 9d is provided with a position regulating portion 9da. The regulating member 9d can be shifted by a drive mechanism (not shown) in its lengthwise direction.

On the other hand, the projecting portion 11 is provided with a certain position regulating portions 11a and 11a with some spacing between them, and the position regulating portion 9da of the regulating member 9d engages with one or the other of the position regulating portions 11a in the magnetic head-loaded state and in the magnetic head-unloaded state. Reference character 9db designates a regulating member for regulating the displacement of the load beam 3 as its counterpart in Embodiment 4.

In the magnetic head-loaded state, the displacement of the load beam 3 by the regulating member 9db to regulate the displacement of the magnetic head slider 7 in the direction parallel to the disk surface. The shifting between the magnetic head-loaded state and the magnetic head-unloaded state is accomplished by the sliding of the regulating member 9d. The configuration is such that, in the magnetic head-loaded state or the magnetic head-unloaded state, the position regulating portion 9da of the regulating member 9d, which also serves as a lifting lever, engage with one of the two position regulating portions 11a of the projecting portion 11. The configuration of this embodiment makes possible more accurate positioning and regulation of the magnetic head than in Embodiment 4.

(Embodiment 8)

Figure 18:
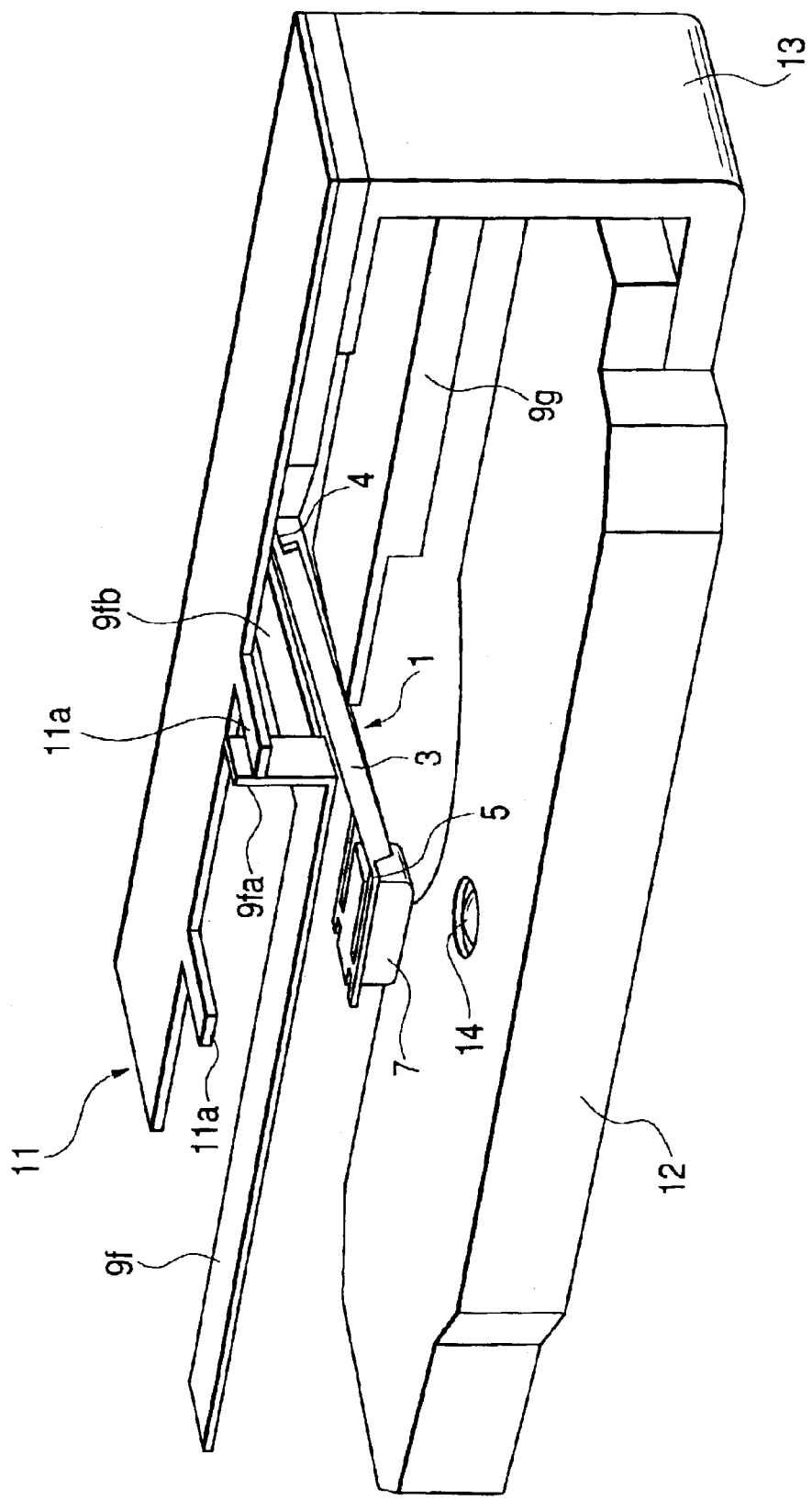
FIG. 18 shows a perspective view of a magneto-optical recording apparatus, which is Embodiment 8 of the invention.

FIG. 18 shows a perspective view of an eighth embodiment of the present invention. This embodiment, similar to Embodiment 6 in basic structure, differs in that the projecting portion 11 is provided over the base 2 of the magnetic head in this embodiment. Usually the projecting portion 11 is provided to protect the magnetic head from impacts or as a buffer stop for the magnetic head slider 7 when shunting from the disk surface in the magnetic head-unloaded state. Further, the regulating member 9f, which also serves as a lifting lever, is arranged, and this regulating member 9f is provided with a position regulating portion 9fa. The regulating member 9f can be shifted by a drive mechanism (not shown) in its lengthwise direction.

On the other hand, the projecting portion 11 is provided with the position regulating portions 11a and 11a so that the position regulating portion 9fa is engaged with one of the position regulating portions in the magnetic head-loaded state and in the magnetic head-unloaded state. One end of the regulating member 9g is fixed to the linking member 13 as its counterpart in Embodiment 6. Reference character 9fb designates a regulating member for regulating the displacement of the load beam 3, and the configuration is such that, as in Embodiment 6, the displacement of the load beam 3 is regulated by the regulating members 9g and 9fb.

In the magnetic head-loaded state, the displacement of the load beam 3 is regulated by the regulating members 9fb and 9g, and the displacement of the magnetic head slider 7 in the direction parallel to the disk surface is regulated. The shifting between the magnetic head-loaded state and the magnetic head-unloaded state is accomplished by the sliding of the regulating member 9f. The configuration is such that, in the magnetic head-loaded state and the magnetic head-unloaded state, the position regulating portion 9fa of the regulating member 9f, which also serves as a lifting lever, engage with one of the two position regulating portions 11a of the projecting portion 11. The configuration of this embodiment makes possible more accurate positioning and regulation of the magnetic head than in Embodiment 6.

(Embodiment 9)

Figure 19A:
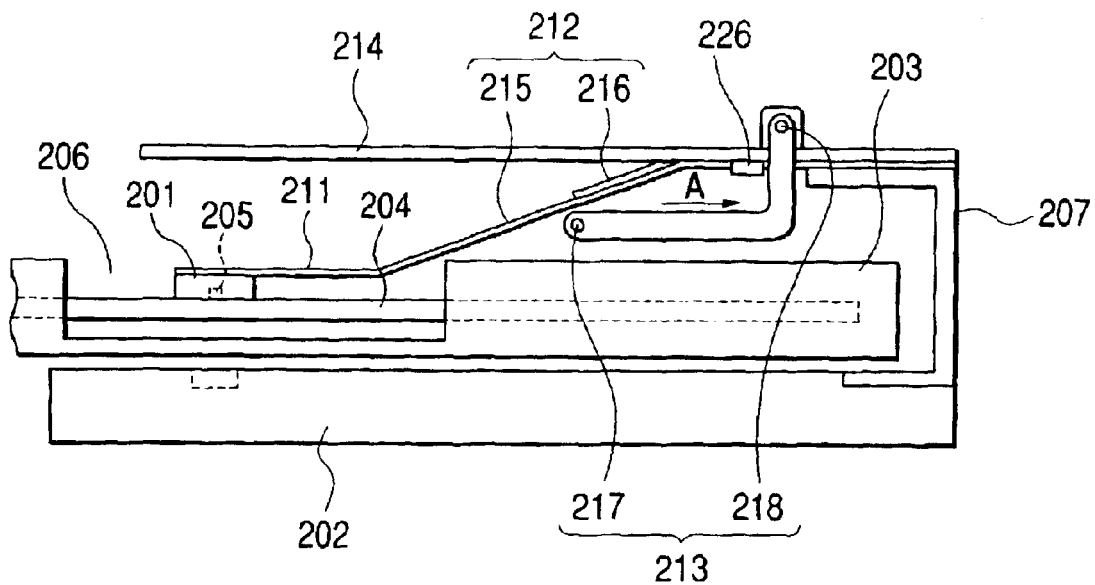
FIGS. 19A and 19B illustrate the loaded state of a magnetic head in a magneto-optical recording apparatus, which is Embodiment 9 of the invention.
Figure 19B:
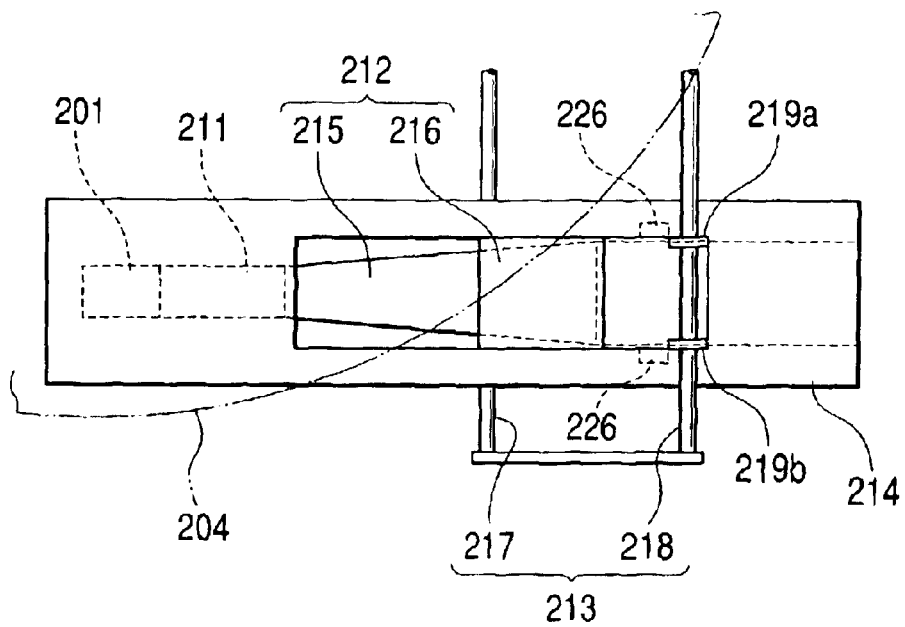
Figure 20A:
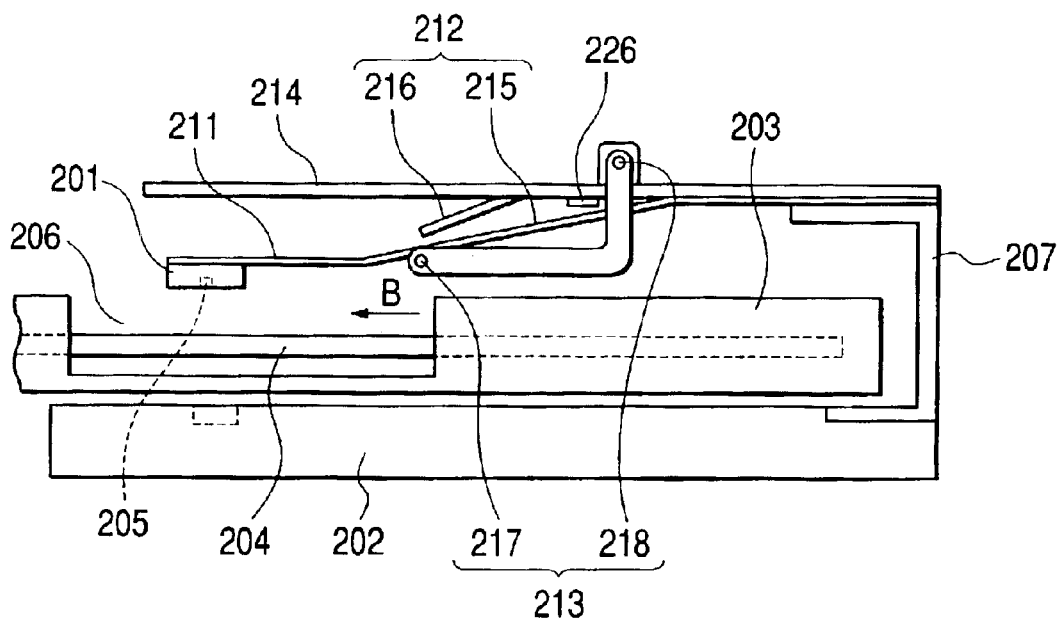
FIGS. 20A and 20B illustrate the unloaded state of the magnetic head in the magneto-optical recording apparatus, which is Embodiment 9 of the invention.
Figure 20B:
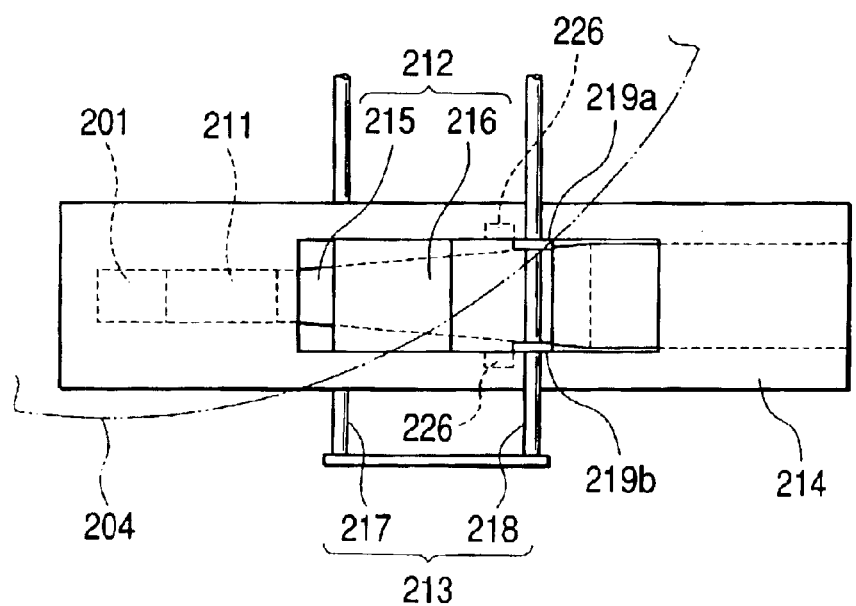

FIGS. 19A and 19B, FIGS. 20A and 20B and FIG. 21 illustrate magneto-optical recording apparatus, which is a ninth embodiment of the present invention. FIGS. 19A and 19B illustrate the loaded state of the magnetic head 1; FIGS. 20A and 20B, the unloaded state of the magnetic head 1; and FIG. 21, a schematic perspective view of a guiding portion in the magnetic head-loaded state. FIGS. 19A and 20A are side views, and FIGS. 19B and 20B are plan views.

In the drawings, reference numeral 203 designates a cartridge; 204, a magneto-optical disk, which is a magneto-optical recording medium contained in the cartridge; 201, a magnetic head slider; and 202, an optical pickup. In a part of the cartridge 203 is formed an opening 206 through which the magneto-optical disk 204 is exposed; in the opening 206, the magnetic head slider 201 is arranged over the upper face of the magneto-optical disk 204, and the optical pickup 202 underneath the bottom face of the magneto-optical disk 204, and both are opposed and linked by a linking member 207. Further, the optical pickup 202 and the magnetic head slider 201 can be shifted to any desired position in the radial direction of the magneto-optical disk 204 by a shifting device (not shown).

The magnetic head slider 201 is held by the tip of a first supporting portion 211, and the first supporting portion 211 in turn is held, together with the magnetic head slider 201, by a second supporting portion 212. At least a greater part of the first supporting portion 211 is arranged within the opening 206 of the cartridge 203 and the second supporting portion 212 is arranged with an inclination from above the upper face of the cartridge 203 towards the opening 206. A magnetic pole 205, which is a magnetic field generating portion, is provided on the magnetic head slider 201, and positional adjustment is so made that, in a state in which the magnetic head slider 201 is loaded, the center of the region of the magneto-optical disk 204 to which a magnetic filed is applied by the magnetic pole 205 and the position of the light spot formed by the optical pickup 202 coincide with each other. Reference numeral 213 designates a drive device for varying the angle of inclination of the second supporting portion 212 when the magnetic head is loaded or unloaded.

Here, the magnetic head slider 201 is held by the tip of the first supporting portion 211, which consists of a leaf spring, and the first supporting portion 211 is held, together with the magnetic head slider 201, by the second supporting portion 212. A metallic base plate 214 is fitted to the linking member 207, and the second supporting portion 212 is fitted to the base plate 214.

Figure 21:
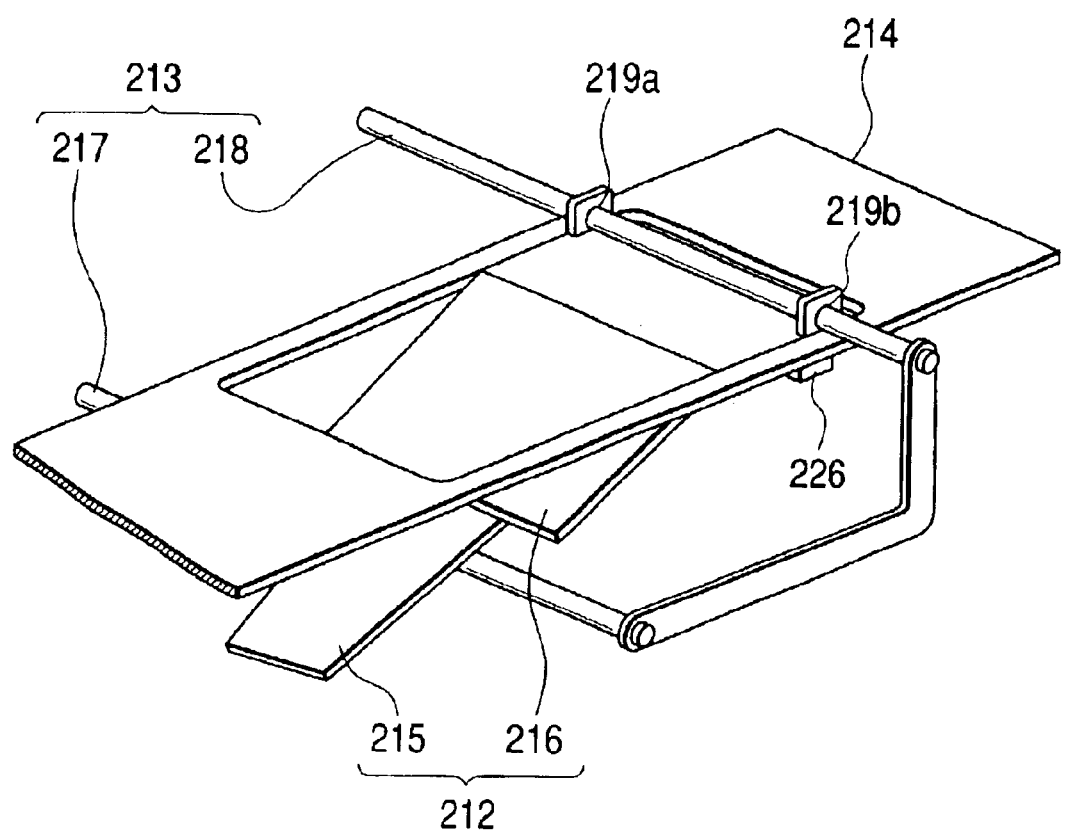
FIG. 21 shows a schematic perspective view of a guiding portion in the magneto-optical recording apparatus, which is Embodiment 9 of the invention.

In this embodiment, the second supporting portion 212 is configured of a load beam 215 consisting of a leaf spring forming a downward bent portion and an auxiliary load member 216 consisting of a leaf-shaped member of a metal plate or the like. The base of the load beam 215 is coupled to the base plate 214, and its tip is connected to the first supporting portion 211. The tip of the auxiliary load member 216 is bent in the same direction as the load beam 215, and its base is engaged to be slidable along the base plate 214 by a guide member 226. Thus, as shown in FIG. 21, the guide member 226 is integrated with a supporting portion (the portion in which holes 219a and 219b are bored) supporting a guide shaft 218 and is further integrated with the base of the auxiliary load member 216. Therefore in this structure, the auxiliary load member 216 is slidably engaged with the base plate 214 by the guide member 226.

The drive device 213 has a configuration in which a lifting shaft 217 parallel to the radial direction of the magneto-optical disk 204 and the guide shaft 218 are linked at both ends; the lifting shaft 217 is arranged underneath the load beam 215, and the guide shaft 218 is pressed through the holes 219a and 219b, bored in the base of the auxiliary load member 216, over the base plate 214. The drive device 213 is coupled to a drive power source, for instance a motor or the like, via a link mechanism (not shown), and the lifting shaft 217, the guide shaft 218 and the auxiliary load member 216 are all driven integrally to slide reciprocatingly in the directions indicated by arrows A and B parallel to the magneto-optical disk 204.

Next will be described the loading/unloading actions of the magnetic head slider 201. First, when the magnetic head slider 201 is to be loaded, the lifting shaft 217 and the guide shaft 218 are integrally driven to slide in the direction of arrow A as shown in FIG. 19A. In this case, the lifting shaft 217 which has been pressing the load beam 215 upwards separates from the load beam 215 and thereby causes the load beam 215 to bend and the magnetic head slider 201 to be suppressed against the magneto-optical disk 204. Also, together with the guide shaft 218, the auxiliary load member 216 slides on the base plate 214, comes into contact with the upper face of the load beam 215 to press it downwards to complete the action to load the magnetic head slider 201.

In the state in which the magnetic head slider 201 is loaded, the springy forces of both the load beam 215 and the auxiliary load member 216 make the rigidity of the second supporting portion 212 greater than when the load beam 215 alone is working. Therefore, when the magnetic head slider 201 is displaced in the vertical direction along with the vertical displacement of the magneto-optical disk 204, the second supporting portion 212 is scarcely displaced and mainly the first supporting portion 211 is displaced.

When the magnetic head slider 201 is to be unloaded, the lifting shaft 217 and the guide shaft 218 are integrally driven to slide in the direction of arrow B, conversely to the direction in the loading action, as shown in FIG. 20A. This causes the auxiliary load member 216 to slide and separate from the load beam 215. Further the lifting shaft 217, as it slides, comes into contact with and thrusts upwards the load beam 215. Then, as shown in FIGS. 20A and 20B, the magnetic head slider 201 is shunted to a higher position than the upper face of the cartridge 203 to complete the unloading action. To add, openings, notches or the like may be formed in a part of the load beam 215 as required to prevent spatial interference from occurring between the load beam 215 and the auxiliary load member 216 during the unloading action.

Here in such an unloading action, as the auxiliary load member 216 first separates from the load beam 215 to eliminate its springy force, the rigidity of the second supporting portion 212 is equal to that of the load beam 215 alone and less than that of the magnetic head slider 201 in the loaded state, the load beam 215 can be displaced with a small enough drive power.

(Embodiment 10)

Figure 22A:
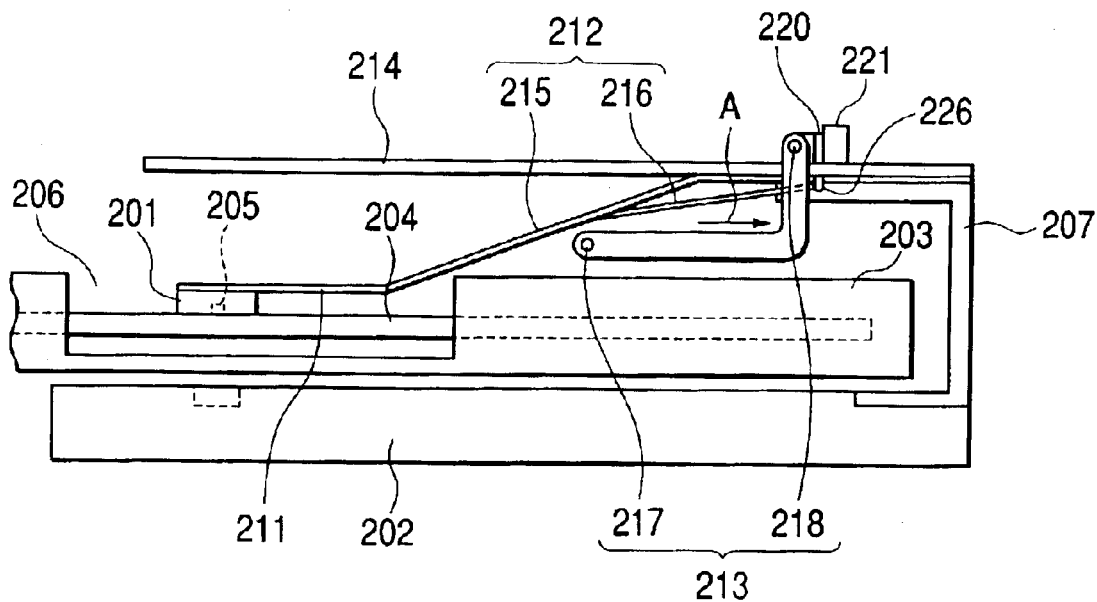
FIGS. 22A and 22B illustrate the loaded state of a magnetic head in a magneto-optical recording apparatus, which is Embodiment 10 of the invention.
Figure 22B:
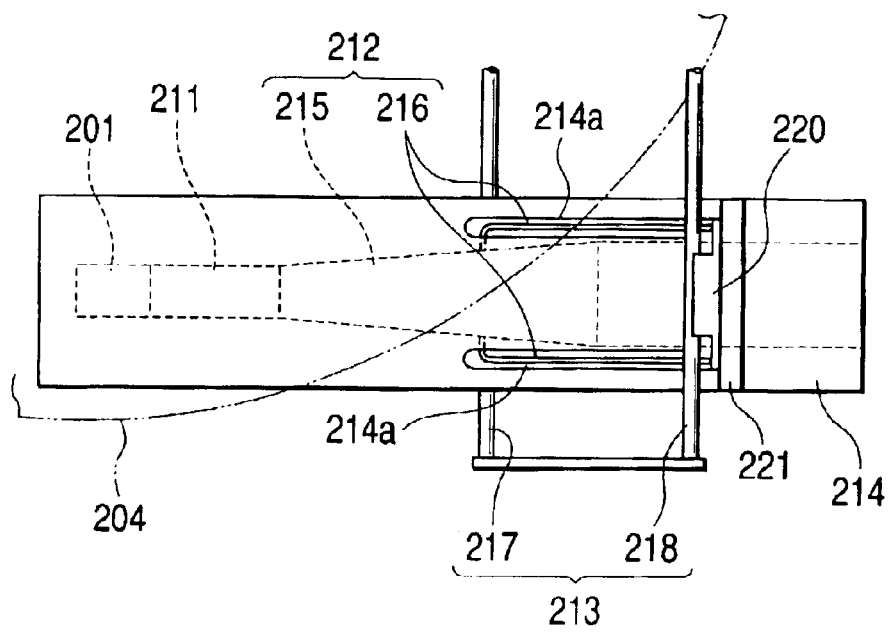
Figure 23A:
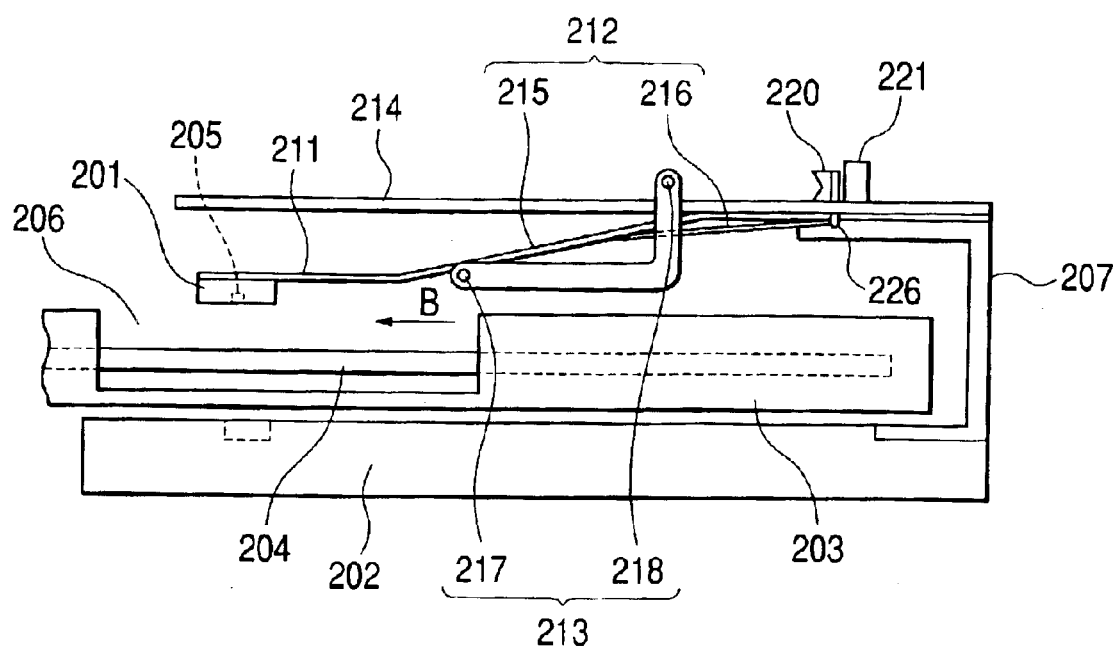
FIGS. 23A and 23B illustrate the unloaded state of the magnetic head in the magneto-optical recording apparatus, which is Embodiment 10 of the invention.
Figure 23B:
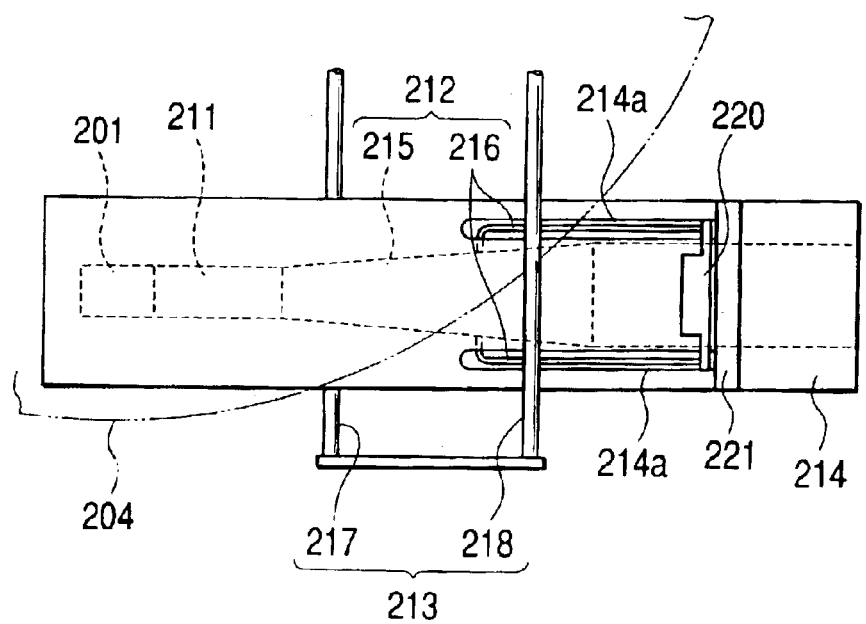
Figure 24A:
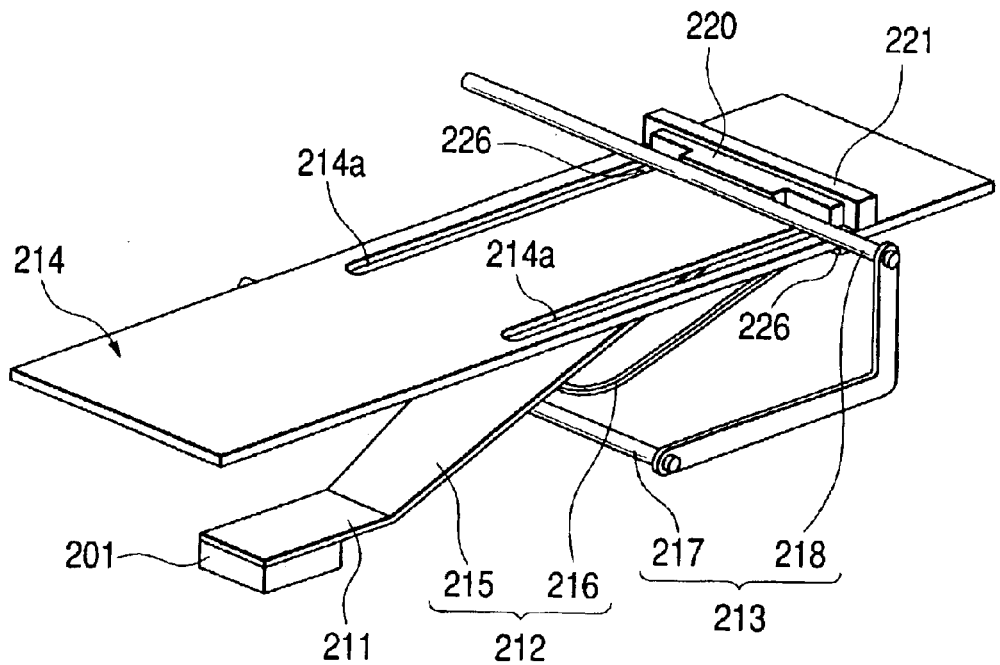
FIGS. 24A and 24B show schematic perspective views of the magnetic head in the magneto-optical recording apparatus, which is Embodiment 10 of the invention.

FIGS. 22A, 22B, 23A, 23B, 24A and 24B illustrate a magneto-optical recording apparatus, which is a 10th embodiment of the present invention. FIGS. 22A and 22B show the loaded state of the magnetic head slider 201; FIGS. 23A and 23B, the unloaded state of the magnetic head slider 201; and FIGS. 24A and 24B, a schematic perspective view of the magnetic head slider 201. FIGS. 22A and 23A are side views, and FIGS. 22B and 23B are plan views. FIG. 24A shows the loaded state and FIG. 24B, the unloaded state.

In the drawings, reference numeral 203 designates a cartridge; 204, a magneto-optical disk, which is a magneto-optical recording medium contained in the cartridge; 201, a magnetic head slider; and 202, an optical pickup. In a part of the cartridge 203 is formed an opening 206 through which the magneto-optical disk 204 is exposed; in the opening 206, the magnetic head slider 201 is arranged over the upper face of the magneto-optical disk 204, and the optical pickup 202 underneath the bottom face of the magneto-optical disk 204, and both are linked by a linking member 207. Further, the optical pickup 202 and the magnetic head slider 201 can be shifted to any desired position in the radial direction of the magneto-optical disk 204 by a shifting device (not shown).

The magnetic head slider 201 is held by the tip of a first supporting portion 211, and the first supporting portion 211 in turn is held, together with the magnetic head slider 201, by a second supporting portion 212. At least a greater part of the first supporting portion 211 is arranged within the opening 206 of the cartridge 203 and the second supporting portion 212 is arranged with an inclination from above the upper face of the cartridge 203 towards the opening 206. A magnetic pole 205, which is a magnetic field generating portion, is provided on the magnetic head slider 201, and positional adjustment is so made that, in a state in which the magnetic head slider 201 is loaded, the center of the region of the magneto-optical disk 204 in which a magnetic filed is applied by the magnetic pole 205 and the position of the light spot formed by the optical pickup 202 coincide with each other. Reference numeral 213 designates a drive device for varying the angle of inclination of the second supporting portion 212 when the magnetic head is loaded or unloaded.

Here, the magnetic head slider 201 is held by the tip of the first supporting portion 211, which consists of a leaf spring, and the first supporting portion 211 is held, together with the magnetic head slider 201, by the second supporting portion 212. A base plate 214 made of a metal plate is fitted to the linking member 207, and the second supporting portion 212 is fitted to the base plate 214.

In this embodiment, the second supporting portion 212 is configured of a load beam 215 consisting of a leaf spring forming a downward bent portion and an auxiliary load member 216 consisting of a leaf-shaped or wire-shaped member of a metal plate or the like. The base of the load beam 215 is coupled to the base plate 214, and its tip is connected to the first supporting portion 211. The tip of the auxiliary load member 216 is coupled to the vicinity of the tip of the load beam 215, and to the base of the auxiliary load member 216 is fitted an engaging member 220 with a V groove formed in a side thereof.

Figure 24B:
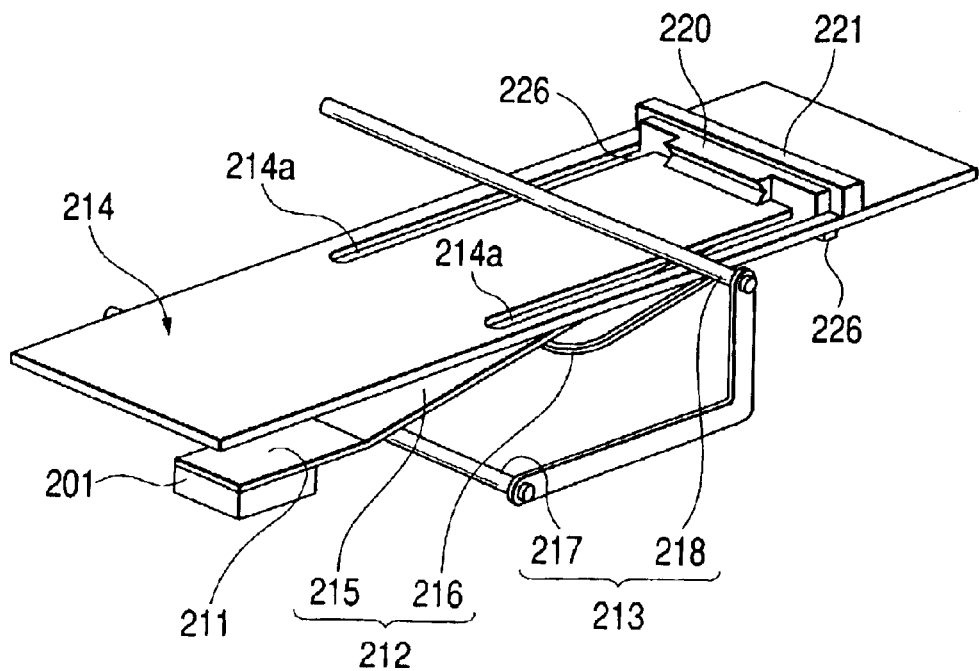

A guiding portion 226 is formed at the base of the engaging member 220 as shown in FIGS. 24A and 24B, and the engagement of this guiding portion 226 with the groove 214a of the base plate 214 makes its sliding possible along, but not separating from, the base plate 214. The load beam 215 and the auxiliary load member 216, or the load beam 215 and the first supporting portion 211 may be formed either as separate members or integrally of the same leaf spring member. The position in which the auxiliary load member 216 engages with the base plate 214 can be selected as desired, whether before or behind the base of the load beam 215. In either case, the auxiliary load member 216 is fitted to permit rotation around the position in which it coupled to the load beam 215 or elastic deformation.

The drive device 213 has a configuration in which a lifting shaft 217 parallel to the radial direction of the magneto-optical disk 204 and the guide shaft 218 are linked; the lifting shaft 217 is arranged underneath the load beam 215, and the guide shaft 218, over the base plate 214. The drive device 213 is coupled to a drive power source, for instance a motor or the like, via a link mechanism (not shown) to slide reciprocatingly in the directions indicated by arrows A and B parallel to the magneto-optical disk 204.

Next will be described the loading/unloading actions of the magnetic head slider 201. First, when the magnetic head slider 201 is to be loaded, the lifting shaft 217 and the guide shaft 218 are integrally driven to slide in the direction of arrow A as shown in FIG. 22A. The lifting shaft 217 which has been pressing the load beam 215 upwards separates from the load beam 215 and thereby causes the load beam 215 to bend and the magnetic head slider 201 to be suppressed against the magneto-optical disk 204. Also, the base of the auxiliary load member 216 slides on the base plate 214, and further the guide shaft 218 comes into contact with and presses the V groove of the engaging member 220 fitted to the auxiliary load member 216, thereby displacing the tip of the load beam 215 further downwards and pressing it against and fixing it to a stopper 221 formed on and protruding from the base plate 214 to complete the loading action. The stopper 221 is provided to enhance the positional accuracy of the auxiliary load member 216 in the loaded state and obtain an appropriate springy force.

In the loaded state of the magnetic head slider 201, as the springy force of the auxiliary load member 216 works in addition to the springy force deriving from the elastic deformation of the load beam 215 itself and furthermore the load beam 215 and the auxiliary load member 216 forms a truss structure together with the base plate 214, the rigidity of the second supporting portion 212 becomes far greater than that of a single leaf spring member. Accordingly, when the magnetic head slider 201 is displaced in the vertical direction along with the vertical displacement of the magneto-optical disk 204, the second supporting portion 212 is scarcely displaced and mainly the first supporting portion 211 is displaced.

When the magnetic head slider 201 is to be unloaded, the lifting shaft 217 and the guide shaft 218 are integrally driven to slide in the direction of arrow B, conversely to the direction in the loading action, as shown in FIG. 23A. This causes first the guide shaft 218 to separate from the engaging member 220 fitted to the auxiliary load member 216, thereby enabling the base of the auxiliary load member 216 to slide in the direction away from the stopper 221. Further the lifting shaft 217, as it slides, comes into contact with and thrusts upwards the load beam 215. Also, the base of the auxiliary load member 216 coupled to the engaging member 220 is displaced while sliding on the base plate 214. Then, as illustrated, the magnetic head slider 201 is shunted to a higher position than the upper face of the cartridge 203 to complete the unloading action.

Here in such an unloading action, as first the fixation of the base of the auxiliary load member 216 is undone, the springy force deriving from the auxiliary load member 216 does not work, and the second supporting portion 212 does not constitute a truss structure. Therefore, the rigidity of the second supporting portion 212 is smaller than in the loaded state of the magnetic head slider 201, and the load beam 215 and the auxiliary load member 216 can be displaced with a small enough drive power.

(Embodiment 11)

Figure 25A:
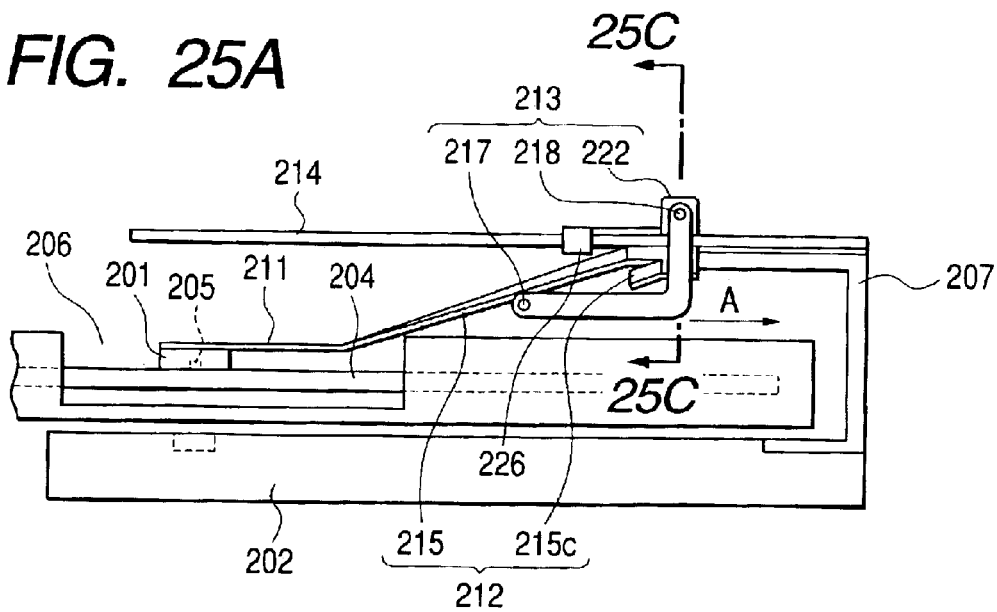
FIGS. 25A, 25B and 25C illustrate the loaded state of a magnetic head in a magneto-optical recording apparatus, which is Embodiment 11 of the invention.
Figure 25B:
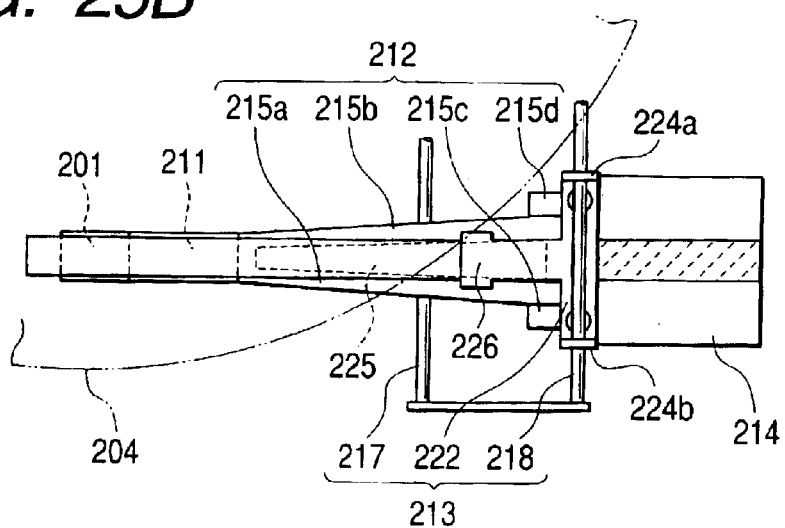
Figure 25C:
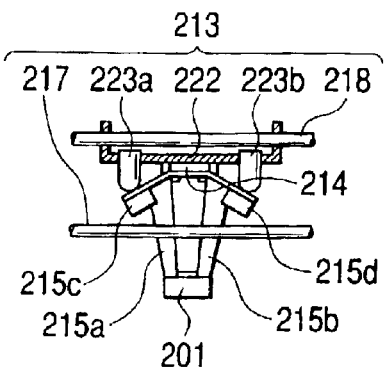
Figure 26A:
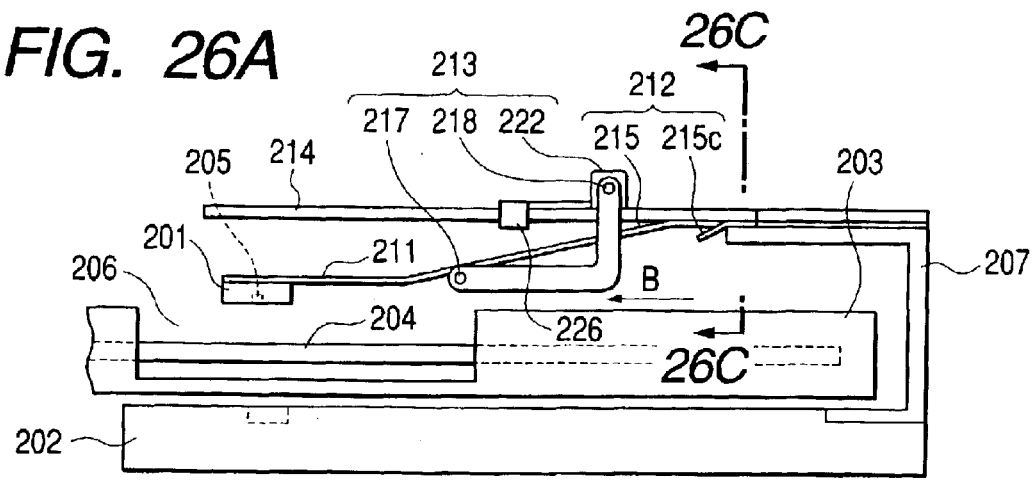
FIGS. 26A, 26B, 26C and 26D illustrate the unloaded state of the magnetic head in the magneto-optical recording apparatus, which is Embodiment 11 of the invention.
Figure 26B:
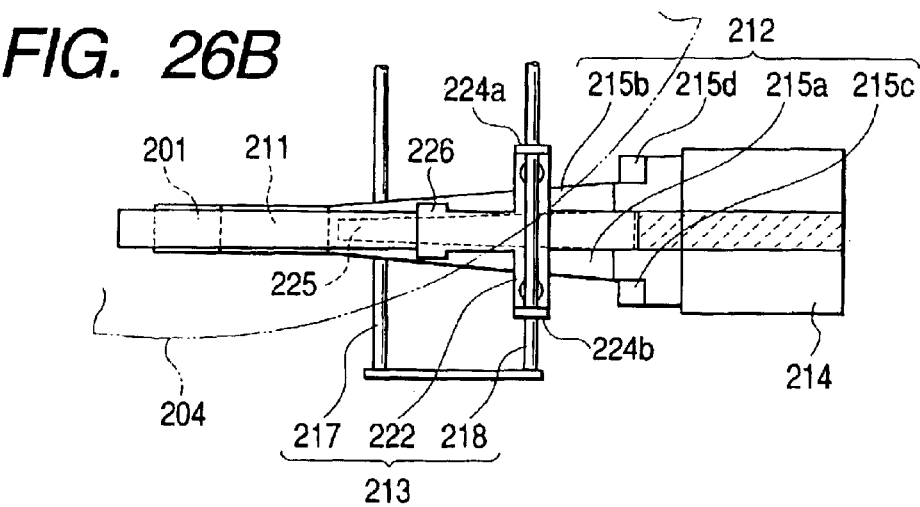
Figure 26C:
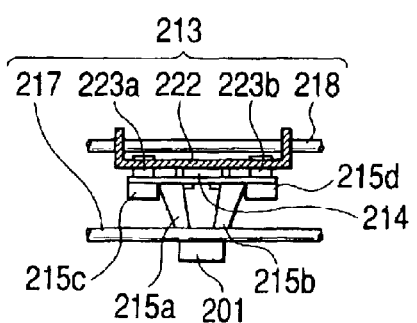
Figure 26D:
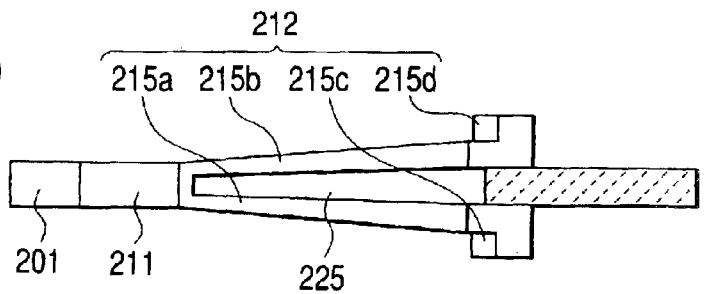
Figure 27A:
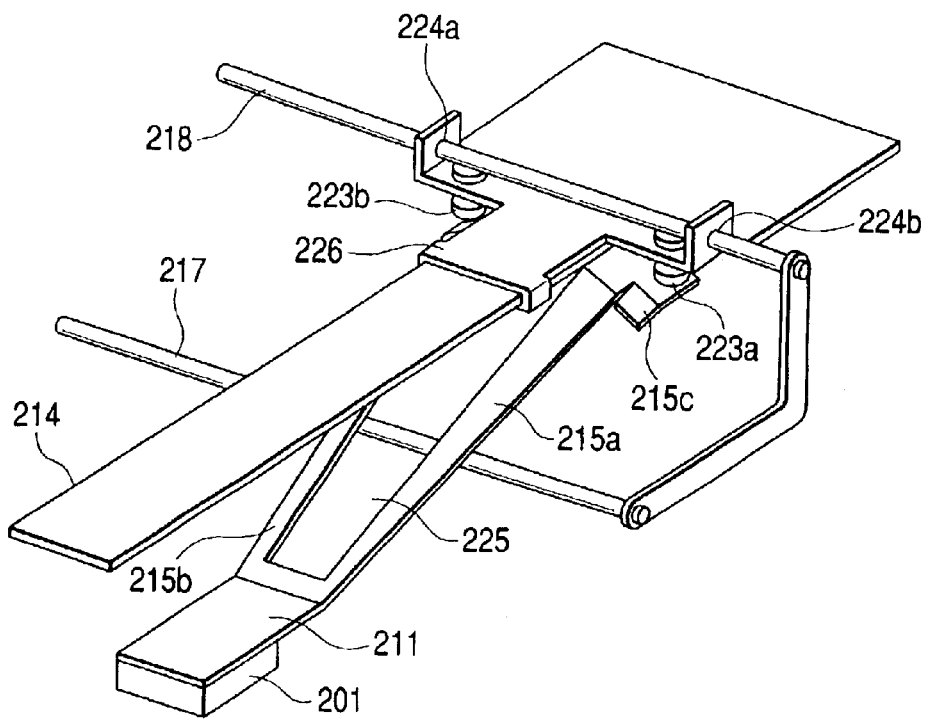
FIGS. 27A and 27B schematically illustrate the magnetic head in the magneto-optical recording apparatus, which is Embodiment 11 of the invention.
Figure 27B:
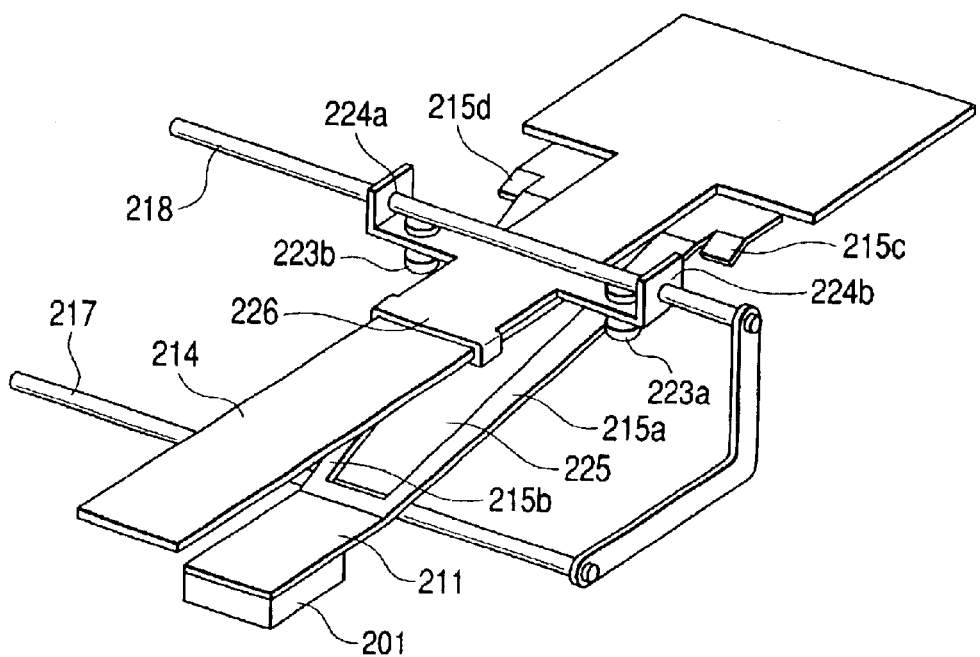

FIGS. 25A to 25C, 26A to 26C, 27A and 27B illustrate a magneto-optical recording apparatus, which is an 11th embodiment of the present invention. FIGS. 25A to 25C illustrate the loaded state of the magnetic head slider 201; FIGS. 26A to 26C illustrate the unloaded state of the magnetic head slider 201; and FIGS. 27A and 27B schematically show a perspective view of the magnetic head slider 201. FIGS. 25A and 26A are side views, FIGS. 25B and 26B are plan views, and FIGS. 25C and 26C are sectional views (taken in the 25C—25C of FIG. 25A) as viewed from the front. FIG. 26D is a plan showing only the magnetic head slider 201, the first supporting portion 211 and the second supporting portion 212 in FIG. 26B; FIG. 27A shows the loaded state and FIG. 27B, the unloaded state.

In the drawings, reference numeral 203 designates a cartridge; 204, a magneto-optical disk, which is a magneto-optical recording medium contained in the cartridge; 201, a magnetic head slider; and 202, an optical pickup. In a part of the cartridge 203 is formed an opening 206 through which the magneto-optical disk 204 is exposed; in the opening 206, the magnetic head slider 201 is arranged over the upper face of the magneto-optical disk 204, and the optical pickup 202 underneath the bottom face of the magneto-optical disk 204, and both are linked by a linking member 207. Further, the optical pickup 202 and the magnetic head slider 201 can be shifted to any desired position in the radial direction of the magneto-optical disk 204 by a shifting device (not shown).

The magnetic head slider 201 is held by the tip of a first supporting portion 211, and the first supporting portion 211 in turn is held, together with the magnetic head slider 201, by a second supporting portion 212. At least a greater part of the first supporting portion 211 is arranged within the opening 206 of the cartridge 203 and the second supporting portion 212 is arranged with an inclination from above the upper face of the cartridge 203 towards the opening 206. A magnetic pole 205, which is a magnetic field generating portion, is provided on the magnetic head slider 201, and positional adjustment is so made that, in a state in which the magnetic head slider 201 is loaded, the center of the region of the magneto-optical disk 204 in which a magnetic filed is applied by the magnetic pole 205 and the position of the light spot formed by the optical pickup 202 coincide with each other. Reference numeral 213 designates a drive device for varying the angle of inclination of the second supporting portion 212 when the magnetic head is loaded or unloaded.

Here, the magnetic head slider 201 is held by the tip of the first supporting portion 211, which consists of a leaf spring, and the first supporting portion 211 is held, together with the magnetic head slider 201, by the second supporting portion 212. A base plate 214 made of a metal plate is fitted to the linking member 207, and the second supporting portion 212 is fitted to the base plate 214.

In this embodiment, the second supporting portion 212 is configured of a load beam 215 consisting of a leaf spring forming a downward bent portion. The width of the load beam 215 gradually narrows from the base towards the tip, and a slit 225 is formed from the vicinity of the base towards the vicinity of the tip along the center line, being branched in two parts 215a and 215b. The load beam 215 at its base is adhered and fixed to the base plate 214 only in the vicinity of its center line (hatched in the drawing). Further, at the ends of the base of the branched portions 215a and 215b of the load beam 215, there are formed slopes 215c and 215d inclined towards the disk surface.

The drive device 213 is composed of the lifting shaft 217, the guide shaft 218 and a pressing member 222. The lifting shaft 217 and the guide shaft 218 are parallel to the radial direction of the magneto-optical disk 204, and linked at the both ends. The pressing member 222 is provided with the guiding portion 226, which is engaged to be slidable along the base plate 214. On the pressing member 222 are formed spherical convexes 223a and 223b respectively opposite the upper faces of the two branched portions 215a and 215b of the load beam 215.

The lifting shaft 217 is formed underneath the load beam 215, and the guide shaft 218 is inserted into holes 224a and 224b bored at one end of the pressing member 222. The drive device 213 is coupled to a drive power source, for instance a motor or the like, via a link mechanism (not shown), and the lifting shaft 217, the guide shaft 218 and the pressing member 222 are all driven integrally to slide reciprocatingly in the directions indicated by arrows A and B parallel to the magneto-optical disk 204.

Next will be described the loading/unloading actions of the magnetic head slider 201. First, when the magnetic head slider 201 is to be loaded, the lifting shaft 217 and the guide shaft 218 are integrally driven to slide in the direction of arrow A as shown in FIG. 25A. The lifting shaft 217 which has been pressing the load beam 215 upwards separates from the load beam 215 and thereby causes the load beam 215 to bend and the magnetic head slider 201 to be suppressed against the magneto-optical disk 204. Also, the pressing member 222 slides on the base plate 214, and the spherical convexes 223a and 223b, respectively guided by the slopes 215c and 215d of the load beam 215, come into contact with the part toward the outer edge of the upper face of the load beam 215 and presses it down.

However, as the load beam 215 is fixed as shown in FIG. 26D, both edges of the branched portions 215a and 215b of the load beam 215 are bent downwards around the boundaries of the respective fixed portions (hatched portions) as shown in FIG. 25C. At the tips of the branched portions 215a and 215b of the load beam 215, the both portions become twisted to maintain them in parallel to each other.

To add, in order to prevent such bending of the load beam 215 from affecting the supporting state of the magnetic head 1 and the first supporting portion 211 directly supporting it, it is desirable to narrow the tip width of the load beam 215 and to let no bending occur in the vicinity of the tip of the load beam 215 by bringing the pressing member 222 into contact with the vicinity of the base. It is also possible to facilitate bending in any desired portion by forming the slit 225 in a suitable position or to provide a restraining member where bending is to be suppressed.

In the loaded state of the magnetic head slider 201, a springy force due to pressing by the pressing member 222 arises in addition to the springy force due to the elastic deformation of the load beam 215 itself. Furthermore, a variation of a section orthogonal to the supporting direction of the load beam 215 (the section shown in FIG. 25C) from a shape parallel to the magneto-optical disk 204 into a shape not parallel to it (a state in which the branched portions 215a and 215b are bent) makes it far more rigid. Therefore, when the magnetic head slider 201 is displaced in the vertical direction along with the vertical displacement of the magneto-optical disk 204, the second supporting portion 212 is scarcely displaced and mainly the first supporting portion 211 is displaced.

When the magnetic head slider 201 is to be unloaded, the lifting shaft 217 and the guide shaft 218 are integrally driven to slide in the direction of arrow B, conversely to the direction in the loading action, as shown in FIG. 26A. This causes first the pressing member 222 to separate from the load beam 215, thereby to release the load beam 215 from pressing by the pressing member 222, returning the branched portions 215a and 215b of the load beam 215, which have been bent, to a mutually parallel state. Further, the lifting shaft 217 slides to come into contact with the load beam 215 and thrusts it upwards. Then, as illustrated, the magnetic head slider 201 is shunted to a higher position than the upper face of the cartridge 203 to complete the unloading action.

Here in such an unloading action, as first the load beam 21 is released from the pressing by the pressing member 222, and at the same time sections orthogonal to the supporting direction of the two branched portions 215a and 215b of the load beam 215 (the section shown in FIG. 26C) both return to a state of being parallel to the magneto-optical disk 204. Therefore, the rigidity of the second supporting portion 212 is smaller than in the loaded state of the magnetic head slider 201, and the load beam 215 can be displaced with a small enough drive power.

Incidentally, in any of the embodiments from the ninth through the 11th, the lifting shaft 217 and the guide shaft 218 have sufficient lengths over the inner and outer circumferences of the magneto-optical disk 204. Further, the second supporting portion 212 can slide along the contact portion with or the inserting portion into the lifting shaft 217 and the guide shaft 218, and this makes it possible for the magnetic head slider 201, in any case of the load state or the unloaded state, to be shifted integrally with the optical pickup 202 to any desired recording position on the magneto-optical disk 204.

(Embodiment 12)

Figure 28A:
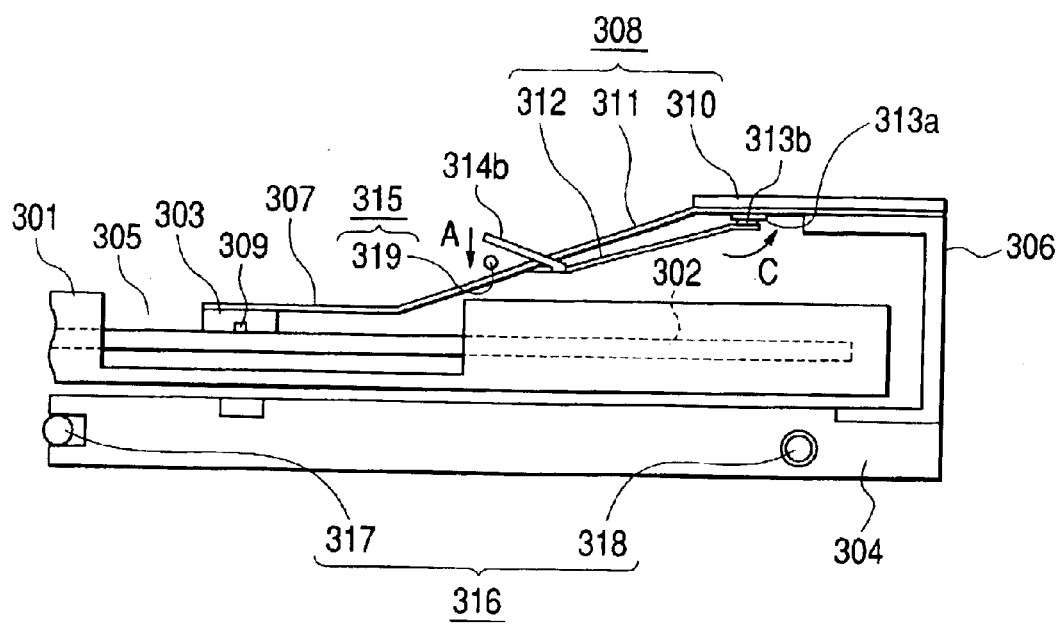
FIGS. 28A and 28B illustrate the loaded state of a magnetic head in a magneto-optical recording apparatus, which is Embodiment 12 of the invention.
Figure 28B:
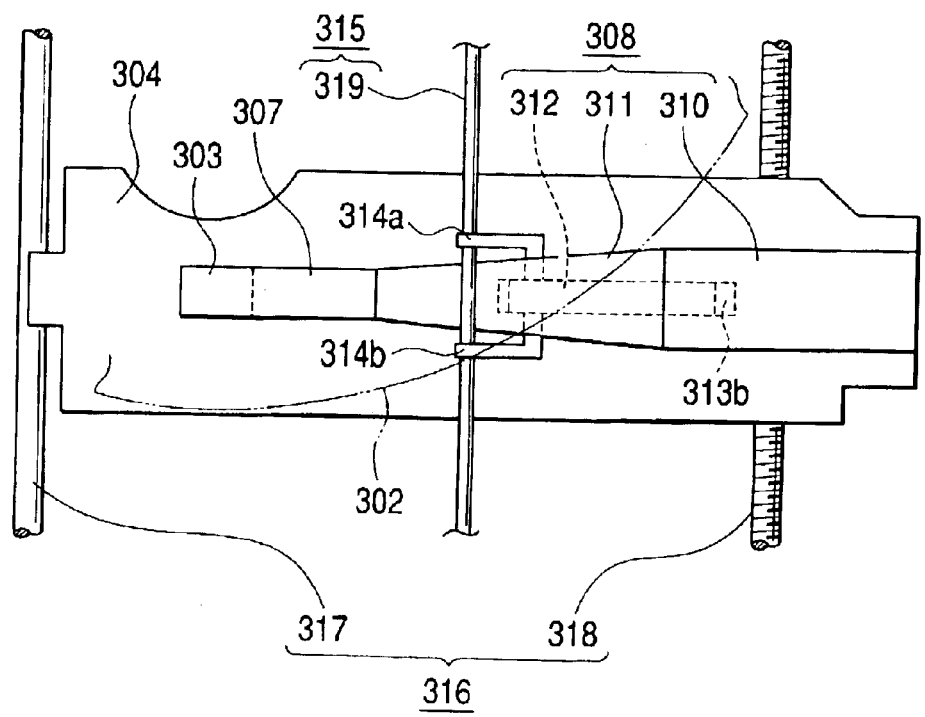
Figure 29A:
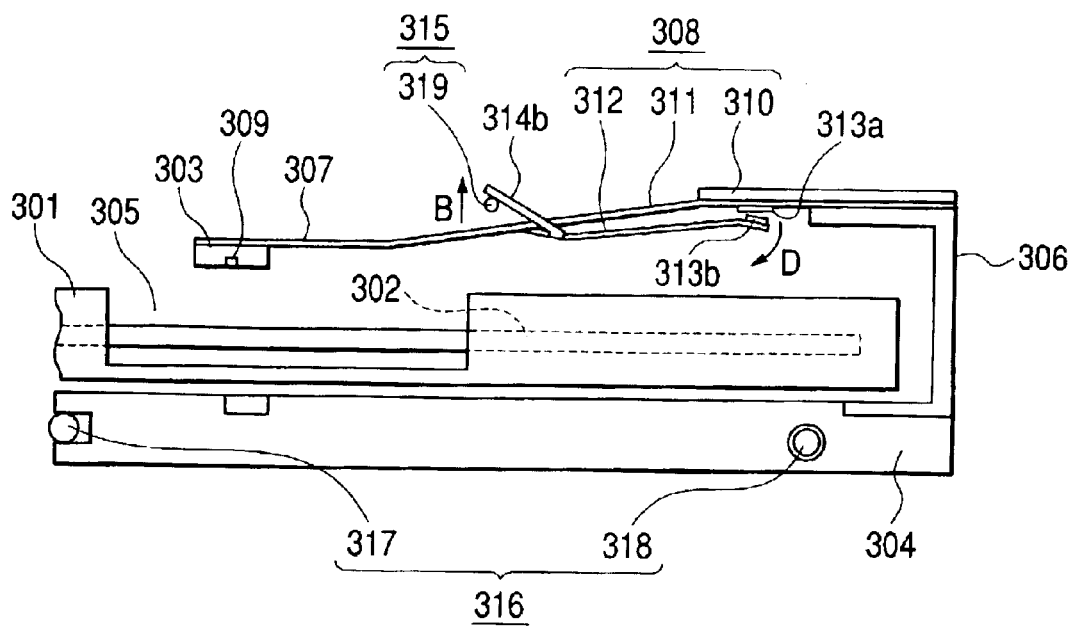
FIGS. 29A and 29B illustrate the unloaded state of the magnetic head in the magneto-optical recording apparatus, which is Embodiment 12 of the invention.
Figure 29B:
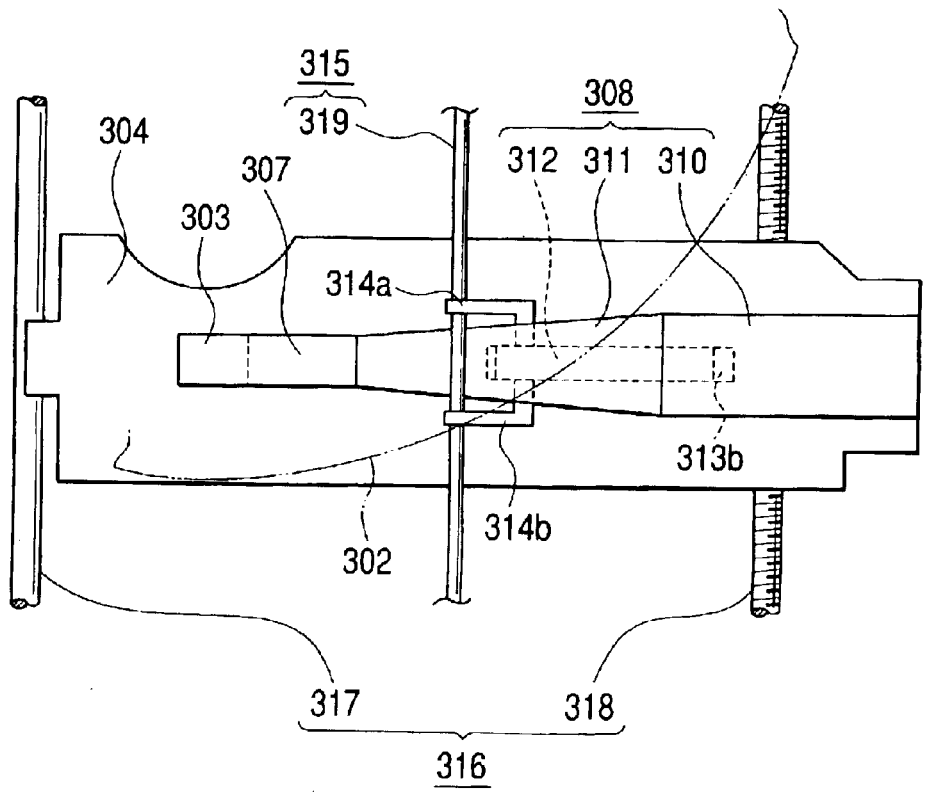

Next will be described in detail another embodiment of the present invention with reference to drawings. FIGS. 28A, 28B, 29A and 29B illustrate a magneto-optical recording apparatus, which is another embodiment of the invention. FIGS. 28A and 28B illustrate the loaded state of a magnetic head and FIGS. 29A and 29B, the unloaded state of the magnetic head. FIGS. 28A and 29A are side views, and FIGS. 28B and 28B are plan views.

In the drawings, reference numeral 301 designates a cartridge; 302, a magneto-optical disk, which is a magneto-optical recording medium contained in the cartridge; 303, a magnetic head slider; and 304, an optical pickup. In a part of the cartridge 301 is formed an opening 305 through which the magneto-optical disk 302 is exposed; in the opening 305, the magnetic head slider 303 is arranged over the upper face of the magneto-optical disk 204, and the optical pickup 304 underneath the bottom face of the magneto-optical disk 302, and both are linked by a linking member 306.

The magnetic head slider 303 is held by the tip of a first supporting portion 307, and the first supporting portion 307 in turn is held, together with the magnetic head slider 303, by a second supporting portion 308. A magnetic pole 309, which is a magnetic field generating portion, is provided on the magnetic head slider 303, and positional adjustment is so made that, in a state in which the magnetic head slider 303 is loaded, the center of the region of the magneto-optical disk 302 in which a magnetic filed is applied by the magnetic pole 309 and the position of the light spot formed by the optical pickup 304 coincide with each other.

The first supporting portion 307 consists of a leaf spring, a greater part of which is arranged within the opening 305 of the cartridge 301. The second supporting portion 308, consisting of a base plate 310, a load member 311 and an auxiliary load member 312, is arranged with an inclination from above the upper face of the cartridge 301 towards the opening 305. The load member 311 is composed of a leaf spring having a downward bent portion; its base is fitted to the base plate 310, which in turn is fitted to the linking member 306. Further a contact member 313a is fitted to the base of the load member 311.

The auxiliary load member 312 consists of a leaf spring, and one end thereof is coupled to the load member 311. To the both sides of the auxiliary load member 312 are fitted levers 314a and 314b extending towards the aforementioned one end, and a contact member 313b is fitted to the other end.

Figure 30:
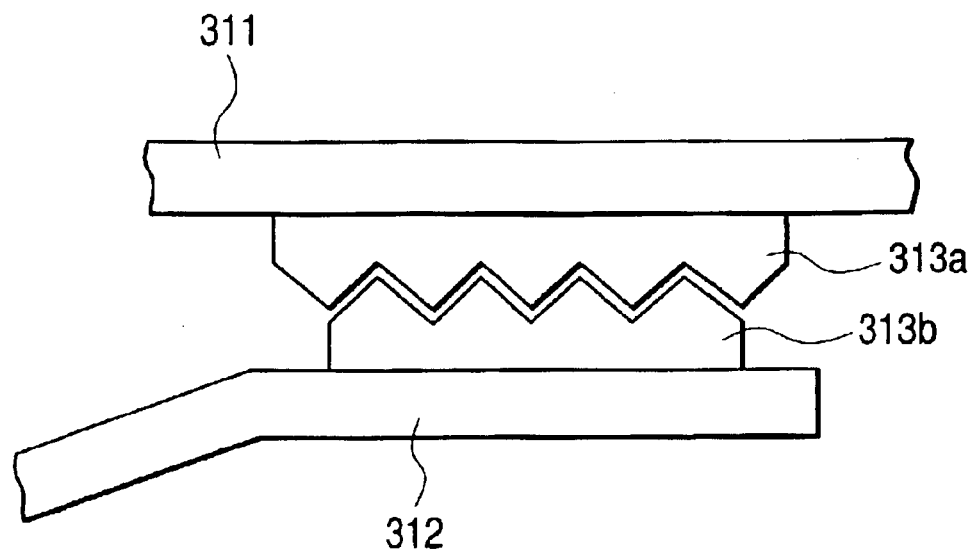
FIG. 30 shows an expanded view of one example of shapes of the contact faces of contact members 213a and 213b in the embodiment shown in FIGS. 28A, 28B, 29A and 29B.

An expanded view of the contact member 313a fitted to the load member 311 and the contact member 313b fitted to the auxiliary load member 312 is shown in FIG. 30. The contact member 313a and the contact member 313b can be brought into contact or separated from each other by deforming the load member 311 or the auxiliary load member 312. On their contact faces are formed mutually meshing fine corrugations, which generate a great frictional force to control sliding in a state in which the contact members 313a and 313b are in contact with each other, especially in the directions in which the load member 311 and the auxiliary load member 312 extend (right and left directions in the drawing).

Reference numeral 315 designates a drive device for driving the second supporting portion 308 when the magnetic head slider 303 is to be loaded or unloaded, and 316, a shifting device for the magnetic head slider 303. The shifting device 316 is composed of a guide shaft 317 extending in the radial direction of the magneto-optical disk 302, a lead screw 318 and a motor (not shown) for rotating it. Together with the optical pickup 304, the first supporting portion 307, the second supporting portion 308 and the magnetic head slider 303 are guided by the guide shaft 317 and shifted to any desired position in the radial direction of the magneto-optical disk 302 by the rotation of the lead screw 318.

The drive device 315 is configured of a lifting shaft 319 extending in the radial direction of the magneto-optical disk 302, a shifting mechanism and a drive power source (not shown) both for driving the vertical motions of the lifting shaft 319, and the lifting shaft 319 is underneath the levers 314a and 314b fitted to the auxiliary load member 312. The drive device 315, though fixed separate from the portion shifted by the shifting device 316, can load or unload the magnetic head slider 303 in any desired position in the radial direction of the magneto-optical disk 302.

Next will be described the actions to load and unload the magnetic head slider 303. First, when the magnetic head slider 303 is to be loaded, the lifting shaft 319 descends in the direction of arrow A as shown in FIG. 28A. In this case, the lifting shaft 319 which has been contact with the levers 314a and 314b of the auxiliary load member 312 and thrust the auxiliary load member 312 and the load member 311 upwards separates from the levers 314a and 314b. This returns the load member 311 to its original bent shape, and its springy force presses the magnetic head slider 303 against the magneto-optical disk 302. This change in the shape of the load member 311 causes the auxiliary load member 312 to be rotationally displaced in the direction of arrow C, and the contact member 313b which has been away from the load member 311 comes into contact with the contact member 313a provided on the load member 311 to generate a springy force.

Thus in the loaded state of the magnetic head slider 303, the auxiliary load member 312 is coupled at one end thereof to the load member 311, and at the other end thereof the contact member 313b comes into contact with the contact member 313a provided on the load member 311 to generate a springy force. When the magnetic head slider 303 is displaced in the vertical direction along with the vertical displacement of the magneto-optical disk 302, a force to cause side-slipping in horizontal directions (right and left directions in the drawing) works on one end of the auxiliary load member 312 where the contact member 313b is provided.

However, such a motion is controlled because a large slide-frictional force is applied to the contact member 313b by the springy force working on the contact member 313a to resist this motion (namely in the reverse direction). As a result, the auxiliary load member 312 restrains the load member 311 so as to increase the rigidity of the second supporting portion 308.

In other words, the structure of the second supporting portion 308 in the loaded state becomes substantially equivalent to a truss structure consisting of two load members, and its rigidity becomes far greater than that of the structure composed of a single load member alone. Therefore, when the magnetic head slider 303 is displaced in the vertical direction along with the vertical displacement of the magneto-optical disk 302, the second supporting portion 308 is scarcely displaced and mainly the first supporting portion 307 is displaced.

Next, when the magnetic head slider 303 is to be unloaded, the lifting shaft 319 ascends in the direction of arrow B, reverse to the direction at the time of loading, as shown in FIG. 29A. This causes, first, the lifting shaft 319 to come into contact with the levers 314a and 314b of the auxiliary load member 312 to thrust upwards the auxiliary load member 312 and the load member 311 while deforming them. Then the auxiliary load member 312 rotates in the direction of arrow D, and the contact member 313b of the auxiliary load member 312 separates from the contact member 313a of the load member 311. Further, the magnetic head slider 303 separates from the magneto-optical disk 302.

As the lifting shaft 319 further ascends, the load member 311 is deformed from a bent shape to a flat shape, and the magnetic head slider 303 is shunted to a higher position than the upper face of the cartridge 301 as shown in FIG. 29A to complete the unloading action.

In such an unloading action here, first the separation of the contact members 313a and 313b from each other releases the load member 311 from the restraint by the auxiliary load member 312. Therefore, the rigidity of the second supporting portion 308 then becomes far smaller than that of the magnetic head slider 303 being loaded, substantially equal to that of a second supporting portion 308 composed only of the load member 311, enabling the subsequent unloading action to require no particularly large drive power.

To add, in order to prevent one end of the auxiliary load member 312 where the contact member 313b is provided from side-slipping in the state where the magnetic head slider 303 is loaded, it is preferable for the slide-frictional force working between the contact member 313b and the contact member 313a to be great enough. To this end, it is effective to roughen the contact faces of the contact member 313b and the contact member 313a or make them of a material having a large friction coefficient, besides forming corrugations thereon as shown in FIG. 30.

Also, since the slide-frictional force is reduced merely by weakening the springy force working on the contact member 313a of the contact member 313b during the unloading action, an effect to displace and deform the second supporting portion 308 with a small driver power can be achieved by reducing the rigidity of the second supporting portion 308, but the most effective way is to completely separate the contact member 313b from the contact member 313a.

Figure 31:
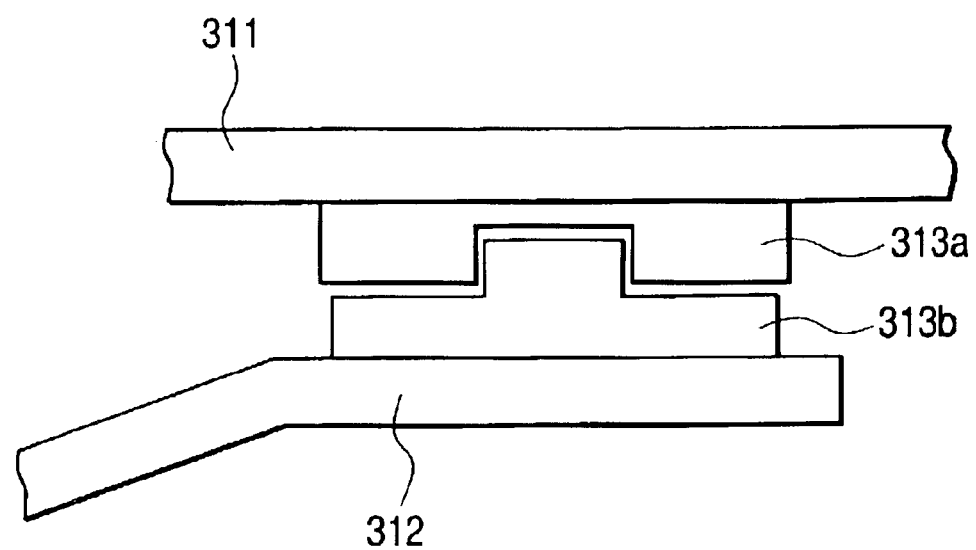
FIG. 31 shows an expanded view of another example of shapes of the contact faces of contact members 213a and 213b in the embodiment shown in FIGS. 28A, 28B, 29A and 29B.

Furthermore, the shape of the contact portions of the contact members 313a and 313b is not limited to the example shown in FIG. 30, but, as shown in FIG. 31, a concave may be formed in the contact member 313a and a convex, on the contact member 313b. In this case, in the state in which the magnetic head slider 303 is loaded, the auxiliary load member 312 may restrain the load member 311 by engaging the concave of the contact member 313a with the convex of the contact member 313b, in the state in which the magnetic head slider 303 is unloaded, the contact member 313b can be disengaged from the contact member 313a by separating them.

The position in which the auxiliary load member 312 comes into contact is not limited to the example described above, and can be any desired position on the second supporting portion 308 (including the load member 311 and the base plate 310), but it preferably should be a fixed position where neither displacement nor deformation can be caused by the loading/unloading action of the magnetic head slider 303.

Thus this embodiment of the present invention is characterized in that, in the state in which the magnetic head slider 303 is loaded on the magneto-optical disk 302, the rigidity of the second supporting portion 308 is increased to control the displacement and deformation of the second supporting portion 308 against the vertical displacement of the magnetic head slider 303 relative to the magneto-optical disk 302 and, during the unloading action of the magnetic head, the rigidity of the second supporting portion 308 is weakened to enable the second supporting portion 308 to be displaced and deformed with a small drive power.

For this purpose, when the magnetic head slider 303 is vertically displaced in the state of being loaded on the magneto-optical disk 302, it is important to cause the auxiliary load member 312 and the second supporting portion 308 to engage with each other so as to resist the force working on the contacting position between the auxiliary load member 312 and the second supporting portion 308 or a slide-frictional force to work on the contacting position of the auxiliary load member 312 and the second supporting portion 308. It is important, in the action to unload the magnetic head slider 303 from the magneto-optical disk 302, to cause the drive device 315 to disengage the auxiliary load member 312 in the position where it is in contact with the second supporting portion 308 or a force to work in the direction of separating the auxiliary load member 312 and the second supporting portion 308 from each other.

Further in this embodiment, since the deformation of the second supporting portion 308 (including the load member 311 and the auxiliary load member 312) is utilized to keep the auxiliary load member 312 and the second supporting portion 308 in contact with each other (under a springy force or in engagement), the lifting shaft 319, which is the drive device 315, can be separated from the second supporting portion 308 in the state in which the magnetic head slider 303 is loaded on the magneto-optical disk 302.

Thus, when the magnetic head slider 303 in the unloaded state is to be shifted in the radial direction of the magneto-optical disk 302, the second supporting portion 308 slides in contact with the lifting shaft 319, but, when the magnetic head slider 303 is to be shifted while being kept in the loaded state, the second supporting portion 308 does not slide in contact with the lifting shaft 319. Therefore, because no vibration due to sliding in contact arises during a shift and propagates to the magneto-optical disk 302 and the optical pickup 304 to adversely affect the focusing control of the light spot, whereby recording can be promptly started after the shift is completed.

What is claimed is:

1. A magneto-optical recording apparatus comprising:
   a magnetic head of which one end is fixed and of which the other end is free and provided with a magnetic field generating portion for applying a magnetic field onto a magneto-optical recording medium;
   an optical pickup, provided opposite said magnetic head with the recording medium between them, for irradiating a portion applied with a magnetic field from said magnetic head with a light beam; and a member for regulating displacement of said magnetic head in a direction parallel to a magneto-optical recording medium surface, wherein said magnetic head comprises at least a magnetic head slider and a supporting member for said magnetic head slider, and wherein said regulating member is in contact with said magnetic head slider to control the displacement of said magnetic head in the direction parallel to the recording medium surface.

2. The magneto-optical recording apparatus according to claim 1, wherein said regulating member can be shunted when said magnetic head is unloaded.

3. A magneto-optical recording apparatus comprising a magnetic head of which one end is fixed and of which the other end is free and provided with a magnetic field generating portion for applying a magnetic field onto a magneto-optical recording medium;

an optical pickup, provided opposite said magnetic head with the recording medium between them, for irradiating a portion applied with a magnetic field from said magnetic head with a light beam; and a member for regulating displacement of said magnetic head in a direction parallel to a magneto-optical recording medium surface, wherein said magnetic head comprises at least a magnetic head slider and a supporting member for said magnetic head slider, and wherein said regulating member switches a rigidity of said supporting member according to whether said magnetic head is loaded or unloaded, and the rigidity of said supporting member is higher in the loaded state than in the unloaded state.

4. The magneto-optical recording apparatus according to claim 3, wherein said regulating member varies the rigidity of said supporting member by varying a shape of said supporting member.

5. The magneto-optical recording apparatus according to claim 3, wherein said regulating member varies the rigidity of said supporting member by applying a springy force to said supporting member or relieving the springy force of said supporting member.

* * * * *

UNITED STATES PATENT AND TRADEMARK OFFICE
CERTIFICATE OF CORRECTION

PATENT NO.    : 6,909,673 B2
DATED         : June 21, 2005
INVENTOR(S)   : Kazuyoshi Ishii et al.

It is certified that error appears in the above-identified patent and that said Letters Patent is hereby corrected as shown below:

Column 1,
Line 55, "is" should read -- are --.

Column 5,
Line 34, "position" should read -- positioned --.

Column 8,
Lines 21 and 61, "engage" should read -- engages --.

Column 9,
Line 33, "filed" should read -- field --.

Column 11,
Line 19, "filed" should read -- field --.

Column 13,
Line 29, "filed" should read -- field --.

Column 14,
Line 26, "in" should be deleted.

Column 19,
Line 14, "comprising" should read -- comprising: --.

Signed and Sealed this

Twenty-fifth Day of October, 2005

JON W. DUDAS
*Director of the United States Patent and Trademark Office*